(12) United States Patent
Miyazaki et al.

(10) Patent No.: US 6,423,446 B1
(45) Date of Patent: Jul. 23, 2002

(54) ELECTRODE PLATE FOR SECONDARY BATTERY WITH NONAQUEOUS ELECTROLYTE AND PROCESS FOR PRODUCING SAME

(75) Inventors: Yuichi Miyazaki; Shin Miyanowaki, both of Tokyo-to (JP)

(73) Assignee: Dai Nippon Printing Co., Ltd., Tokyo-to (JP)

(*) Notice: Subject to any disclaimer, the term of this patent is extended or adjusted under 35 U.S.C. 154(b) by 0 days.

(21) Appl. No.: 09/437,827

(22) Filed: Nov. 10, 1999

(30) Foreign Application Priority Data

Nov. 12, 1998 (JP) .......................................... 10-322200

(51) Int. Cl.$^7$ ................................................ H01M 4/26
(52) U.S. Cl. ........................ 429/209; 156/289; 152/234
(58) Field of Search ...................... 429/209; 156/289, 156/234; 152/234

(56) References Cited

U.S. PATENT DOCUMENTS 5,475,480 A * 12/1995 Cahill et al. ................ 655/278
6,054,010 A * 4/2000 Tanaka et al. .............. 156/289

* cited by examiner

Primary Examiner—Gabrielle Brouillette
Assistant Examiner—M. Wills
(74) Attorney, Agent, or Firm—Ladas & Parry

(57) ABSTRACT

The present invention provides an electrode plate having a collector 1, an active material layer 2 and a non-coated portion 3 and satisfies at least one of the following conditions. (1) The maximum thickness in an area inside by 20 mm from an edge portion of the active material layer is not more than the sum of an average thickness of the active material layer and 10 $\mu$m. (2) In an inclined portion of the peripheral edge portion of the active material layer, an area in which the thickness of the active material layer is not less than 1 $\mu$m and less than an average thickness of the active material layer has a width of not more than 1 mm. (3) An absolute value of a positional shifting of an actually formed pattern with respect to a true boundary line of a predetermined pattern is not more than 1 mm. (4) The active material layers are formed in a plane symmetry to front and back surfaces of the collector, and an absolute value in the positional shifting between the patterns formed on front and back side surfaces of the collector is not more than 1 mm.

6 Claims, 13 Drawing Sheets

ELECTRODE PLATE FOR SECONDARY BATTERY WITH NONAQUEOUS ELECTROLYTE AND PROCESS FOR PRODUCING SAME

BACKGROUND OF THE INVENTION

1. Field of the Invention

The present invention relates to an electrode plate for a secondary battery with a nonaqueous electrolyte (which may be referred to as "electrode plate" hereinafter) represented by a lithium ion secondary battery, and also relates to a process for producing the electrode plate. More particularly, the present invention relates to an electrode plate for a secondary battery with a nonaqueous electrolyte and a producing process thereof providing improved precisions in dimensions and thicknesses of an active material layer and a non-coated portion.

2. Description of the Related Art

In recent years, reduction in size and weight of electronic equipment and communication equipment has been rapidly advanced, and this advance has been also required reduction in size and weight of secondary batteries used as driving power sources for these equipments. For these requests, there have been proposed secondary batteries with a non-aqueous electrolyte having high energy density and high voltage, typically, a lithium ion secondary battery, in place of conventional alkaline batteries.

For both positive and negative electrode plates which give great influence on performance of the secondary battery, it is desired, in order to elongate a charge/discharge cycle life and to realize a high energy density, to make larger an area of the electrode plate disposed in the battery by making thin the electrode plate.

For examples, Japanese Patent Laid-open Publication Nos. SHO 63-10456 and HEI 3-285262 disclose positive electrode plates which are produced by the steps of: dispersing or dissolving an active material powder for the positive electrode plate, which is composed of metallic oxides, sulfides, halides or the like, a conductive material and a binding material (binder) into a suitable wetting agent (referred to as "solvent" hereinafter) to prepare an active material coating solution in a form of paste; and applying the active material coating solution on a surface of a collector as a substrate made of a metallic foil. In the electrode plate thus produced, as the binder, there is used fluororesin such as polyvinylidene fluoride or the like, siliconeacrylic copolymer, or styrene-butadiene copolymer.

On the other hand, a negative electrode plate is produced by adding a material, prepared by dissolving a binder into a suitable wetting agent (solvent), to an active material for the negative electrode such as carbon so as to prepare a coating solution for the active material in the form of paste and applying such active material coating solution on a surface of a collector made of metallic foil. Further, in order to improve the density of a coating film with respect to the collector and improve an adhesive property (adhesion) of the coating film thereto, a press treatment is usually performed.

It is required for the binder for preparing the active material coating solution for the above-mentioned coating type electrode plate to be chemically stable to the nonaqueous electrolyte, to be insoluble against the nonaqueous electrolyte and to be capable of being dissolved by some solvent and being coated thin on the substrate.

Furthermore, it is also required for the active material layer, which is coated and dried to have a sufficient flexibility so as to prevent peeling, chipping, cracking or the like at the assembling process of the battery and to have an excellent adhesion to the collector.

Further, terminals for taking out electric current are mounted to the positive and negative electrode plates, respectively, and both the electrode plates are then wound up together with a separator disposed between them for preventing short-circuit between both the electrode plates, which are then sealed in a container filled up with the nonaqueous electrolyte, thus assembling a secondary battery. In the thus assembled secondary battery, in the case of no capacity balance between the positive and the negative electrodes, there is a fear of causing various problems. For example, in a case where the negative electrode has a less amount of active material and the battery capacity of the negative electrode is smaller than that of the positive electrode, it is not possible to charge, into a space between carbon layers of the negative electrode, all the lithium ions coming out from the positive electrode into the electrolyte at the charging reaction time, and the lithium ions becomes excessive in the electrolyte, which forms lithium metal therein and which may deposit a dendrite (column-shape) on the negative electrode plate. If such deposit grows, the separator interposed between both the electrode plates may be broken, which results in the short-circuit therebetween, and the performance of the battery may be extremely damaged. In order to obviate such problem, the active material for the negative electrode plate is coated much in amount than that for the positive electrode thereby to keep the capacity balance of the positive and the negative electrodes.

Further, the electrode plates are usually provided with non-coated portions to which the active material is not formed such as portions to which the terminals for taking out electric current are mounted and boundary portions between the adjacent active material layers. A pattern of a non-coated (non-coating) portion is optionally determined in accordance with a design of the battery. The methods for preparing such non-coated portion include a method of directly forming a pattern of the coated portion and the non-coated portion by coating the electrode coating solution on the collector while mechanically controlling a coater head and a method of forming a coating film (coated film) entirely on the collector surface and then locally peeling the coated film by mechanical means such as knife thereby to form a non-coated portion.

In the former method, supply-start and supply-stop of the active material coating solution from the coater head are repeated while moving the coater head and/or collector in conformity with the pattern of the coated portion or non-coated portion, or every time the coating working reaches to the boundary portion between the coated portion and the non-coated portion, movement-stop and movement-restart of the coater head and/or collector, separation and re-approach of the coater head with respect to the surface to be coated, and supply-stop and supply-restart of the electrode coating solution are performed repeatedly in a synchronous manner. Intermittent coating workings are thus performed by the mechanical control of the coater head thereby to form an intermediate product of the electrode in which, for example, active material layers each having a length of 600 mm and non-coated portions each having a length of 50 mm are formed alternately repeatedly on the surface of an elongated collector having a predetermined width.

However, as the coating speed is increased, it becomes difficult to perform the mechanical control of the coater head so as to accord with the coating speed, and it becomes impossible to exactly form the pattern in which the coated portions and the non-coated portions are alternately repeatedly formed. Particularly, in a case where it is desired to form the non-coated portions, each having a relatively narrow area, intermittently repeatedly in the portion to be coated, it is extremely difficult to exactly form a pattern of the non-coated portion at a high speed. Furthermore, for the reason that the motion of the coater head cannot follow the high coating speed, local coating amount becomes slightly excessive at the respective supply-start positions, which results in the formation of a built-up (protruded) edge portion of the active material layer. On the other hand, there is a tendency of local coating amount being slightly short at the respective supply-stop positions, and so-called, tailing phenomenon will be caused, and hence, the edge portion of the active material layer inclines. In this inclined portion, the thickness of the active material layer decreases towards the boundary portion of the non-coated portion. The tailing phenomenon becomes remarkable as the coating speed increases and the inclined portion of the active material layer becomes long. When the tailing phenomenon becomes remarkable, the boundary line of the edge portion of the active material layer provides a wave-shape, thus being inconvenient.

As mentioned above, in the method of mechanically controlling the coater head, when the coating speed is increased, the shape and thickness of the edge at the peripheral portion of the active material layer is made in uniform. Then, if the capacity balance between the positive electrode and the negative electrode is determined in the assumption of dispersion at the peripheral edge portion of the active material for the positive electrode, much amount of the active material for the negative electrode is required, thus increasing material loss, and the battery capacity is made small in spite of the much using amount of the active material.

In the case where the edge portion of the active material layer is built up, a damage will be applied to the electrode plate and a pressing machine at the press working time to the electrode, it will become difficult to finely wind up the electrode plate and, moreover, the separator will be likely broken in the battery, thus providing problems.

In the case of less patterning performance of the active material layer, there will be provided a problem that the automatic sensing of the positions of the active material layer and the non-coated portion is made difficult. In the case where the active material layers are formed to both the surfaces of the collector through the mechanical controlling of the coater head, the active material layer having a predetermined pattern is first formed to one surface and, thereafter, another active material layer pattern is formed to the other surface while detecting the position of the first formed active material layer by means of sensor. Accordingly, in a case where the first mentioned active material layer is formed with a worse patterning performance, a patterning performance of the active material layer formed to the latter mentioned surface will also become worse. Furthermore, at the battery assembling time, the position of the non-coated position is automatically sensed, and in this time, in the case of worse patterning performance of the active material layer, this automatic sensing becomes itself difficult.

In the method of mechanically controlling the coater head, if the coating is carried out at a relatively slow coating speed, the above-mentioned inconveniences will be reduced to some extent. However, such reduction of the inconveniencies has a limit in its improvement, and moreover, it is difficult to increase the productivity of the electrode plates. As a method of performing the coating with a desired pattern, the coater head is mechanically controlled. For example, there are known methods of slot die coating, slide die coating and comma reverse coating, and except for these methods, there are also known, as methods which do not mechanically control the coater head, gravure coating and gravure reverse coating, for example. However, the methods not mechanically controlling the coater head are applicable to cases where a thin coating layer is formed, but not applicable to cases where a relatively thick layer such as active material layer is formed. For the reasons mentioned above, in the conventional technology, the active material layer and the non-coated portion are formed by the coating method in which the coater head is mechanically controlled in spite of less productivity of the electrode plate.

On the other hand, in the case of the latter mentioned method, that is, in the method in which the coated film is partially peeled by mechanical means such as knife after the formation of the coating film on the entire surface of the collector, the patterning performance is not made high and it is difficult to make smooth the edge portions of the active material layer, so that production of powder at the edge portion is caused, thus providing problems.

SUMMARY OF THE INVENTION

The present invention was achieved in consideration of the above facts and matters. The first object of the present invention is to provide an electrode plate having a high thickness precision at a peripheral portion of an active material layer and/or positional precision at a boundary portion between the active material layer and a non-coated portion.

A second object of the present invention is to provide a method of manufacturing an electrode plate having the high dimensional precision or high thickness precision at the peripheral edge portion of the active material layer.

According to the present invention, the following first to fourth electrode plates are provided.

(1) First Electrode Plate

An electrode plate for a secondary battery with a non-aqueous electrolyte at least comprising a collector, an active material layer containing at least an active material and a binder and formed in a predetermined pattern on the collector, and a non-coated portion at which the collector is exposed in a pattern complementary to the pattern of the active material layer, wherein a maximum thickness of a peripheral edge portion of the active material layer in an area inside by 20 mm from a boundary portion between the non-coated portion and the active material layer is not more than sum of an average thickness of the active material layer and 10 $\mu$m.

(2) Second Electrode Plate

An electrode plate for a secondary battery with a non-aqueous electrolyte at least comprising a collector, an active material layer containing at least an active material and a binder and formed in a predetermined pattern on the collector, and a non-coated portion at which the collector is exposed in a pattern complementary to the pattern of the active material layer, wherein, in an inclined portion of a peripheral edge portion of the active material layer in which a thickness of the active material layer increase towards inside from a boundary portion between the non-coated portion and the active material layer, a width of an area, in which a thickness of the active material layer is not less than 1 μm and less than an average thickness of the active material layer, is not more than 1 mm.

(3) Third Electrode Plate

An electrode plate for a secondary battery with a non-aqueous electrolyte at least comprising a collector, an active material layer containing at least an active material and a binder and formed in a predetermined pattern on the collector, and a non-coated portion at which the collector is exposed in a pattern complementary to the pattern of the active material layer, wherein, an absolute value of a shifting of a boundary line between an actually formed active material layer and an actually formed non-coated portion with respect to a true boundary line of the predetermined pattern is not more than 1 mm.

(4) Fourth Electrode Plate

An electrode plate for a secondary battery with a non-aqueous electrolyte at least comprising a collector, active material layers containing at least an active material and a binder and formed in predetermined patterns on both surfaces of the collector, and non-coated portions at which the surfaces of the collector are exposed in patterns complementary to the patterns of the active material layers, wherein both the active material layers formed on both the surfaces of the collector are formed in plane symmetry with the collector being interposed therebetween and an absolute value of a positional shifting between a boundary line between an actually formed active material layer formed on a front surface of the collector and an actually formed non-coated portion on the front surface of the collector and a boundary line between an actually formed active material layer formed on a back surface of the collector and an actually formed non-coated portion on the back surface of the collector is not more than 1 mm.

The electrode plates according to the present invention satisfy at least one, preferably all, of the above conditions. Accordingly, the very high positional precision and dimensional precision of the active material layer and the non-coated portion can be achieved.

A preferred method of producing the electrode plates of the present invention mentioned above comprises:

a step for forming a high polymer resin layer from a high polymer resin selected from the group consisting of styreneacrylonitrile, polymethylmethacrylate, polydiisopropylfumarate and derivatives thereof in an area of a surface of a collector in which a non-coated portion is to be formed;

a step for forming an active material layer, by applying a coating solution for the active material layer containing at least an active material and a binder, on the collector surface on which the high polymer resin layer is formed;

a step for selectively performing thermo-compression bonding of a thermoplastic resin sheet or thermoplastic resin product to an area in which the non-coated portion is to be formed; and a step for forming the non-coated portion at which the collector surface is exposed and the active material layer having a pattern complementary to a pattern of the non-coated portion by peeling off, after the thermo-compression bonding, the thermoplastic resin sheet or thermoplastic resin product from the collector thereby to peel off the active material layer, together with the high polymer resin layer, in the area in which the non-coated portion is to be formed.

In the method of the present invention, the coating solution for the active material layer is coated after forming the high polymer resin layer formed of the material mentioned above to the area of the surface of the collector in which the non-coated portion is to be formed. For the time being after the coating, the coated layer of the coating solution for the active material layer has not been dried and the high polymer resin layer is gradually dissolved and transferred in the coated layer. For this reason, when the coated layer has been dried and formed the active material layer, the high polymer resin layer is impregnated and solidified only in the active material layer in the area in which the non-coated portion is to be formed, and hence, the cohesive force of the active material layer in this area is made higher in comparison with that of the surrounding portion. Further, the high polymer resin layer has not been completely absorbed and somewhat has remain and exist between the collector and the dried active material layer in the area in which the non-coated portion is to be formed. For this reason, the active material layer in the area in which the non-coated portion is to be formed adheres to the collector through the high polymer resin layer having a weak adhesion.

Then, when the thermoplastic resin sheet or thermoplastic resin product is thermo-compressively bonded to the active material layer in the area in which the non-coated portion is to be formed, the thermoplastic resin sheet or thermoplastic resin product is secured to the active material layer in this area, and the thermoplastic resin layer is impregnated and then solidified in the active material layer in this area, thus further increasing the cohesive force.

Under this state, when the thermoplastic resin sheet or thermoplastic resin product is peeled and removed, the active material layer and the high polymer resin layer in the area in which the non-coated portion is to be formed adhere to the thermoplastic resin sheet or thermoplastic resin product and are then removed together therewith. In this manner, the non-coated portion at which the collector surface is exposed and the active material layer, which has a pattern complementary to a pattern of that non-coated portion, can be exactly formed.

Furthermore, in the method of the present invention, the non-coated portion is formed by forming the active material layer in form of the solid pattern on the collector and then peeling off the active material layer in conformity with the predetermined pattern. Accordingly, any build-up portion and/or long inclined portion is not formed at the edge portion of the active material layer.

Still furthermore, since the coating solution for the high polymer resin can sufficiently realize its function even with a small amount thereof, the coating solution can be coated on the surface of the collector by the method requiring no mechanical control of the coater head such as gravure coating method, gravure reverse coating method or the like method. Therefore, in the case where the coating solution for the high polymer resin layer is coated in the form of the predetermined pattern, this coating can be done at a speed higher than the coating speed for applying the coating solution for the active material layer in the form of the predetermined pattern with high precision and at high productivity. Still furthermore, in the case where the active material layer is peeled off by the method of the present invention, since the edge portion of the active material layer can be smoothly formed, production of powder at the edge portion of the active material layer is hardly observed different from the case of using a knife or the like.

The powder material may be dispersed in the high polymer resin layer. When the high polymer resin layers are formed on both the surfaces of the collector and the collectors are overlapped, a blocking phenomenon is liable to be caused. On the other hand, the dispersion of the powder material into the high polymer resin layer functions to prevent the blocking from causing and to impart a sliding property. Furthermore, the addition of the powder material will reduce the adhesion between the collector and the active material layer, thus being effective.

In one preferred embodiment of the electrode plate producing method of the present invention, it may be possible to selectively coat the adhesive, before the coating of the coating solution for the active material layer, in the area of the surface of the collector in which the active material layer is to be formed thereby to form an adhesive layer. In the case where the the active material layer is formed after the high polymer resin layer is formed to the area in the surface of the collector in which the non-coated portion is to be formed and the adhesive layer is then formed in the area in which the pattern of the active material layer is to be formed, the difference, in the peelability or adhesion property of the active material layer formed in the area in which the non-coated portion is to be formed, from that of the active material layer formed in the area in which the active material layer is to remain can be further made large. Accordingly, the selective peeling of the active material layer can be further easily performed.

In another one electrode plate producing method of the present invention, the patterns of the active material layers, arranged in a plane symmetry with the collector being interposed therebetween and having very slight positional shifting, can be formed on both the surfaces of the collector by arranging the areas in which the non-elected portions are to be formed to both the surfaces of the collector in the plane symmetry with the collector being interposed therebetween, forming the high polymer resin layers to the areas respectively, forming the active material layers to both the surfaces of the collector on which the high polymer resin layers are formed, thermocompressively bonding the thermoplastic resin sheets or thermoplastic resin products simultaneously to the areas of both the surfaces of the collector in which the non-coated portions are to be formed, and after the thermocompression bonding, the thermoplastic resin sheets or thermoplastic resin products are peeled off from the collector.

In this embodiment, after the active material layers have been formed on both the surfaces of the collector, the areas in which the non-coated portions are to be formed are simultaneously aligned in positions by clamping these areas by the paired thermoplastic resin sheets or thermoplastic resin products, so that the position alignment can be effectively performed and the positional shifting of the patterns on both the surfaces of the collector can be effectively prevented from causing. According to this embodiment, for example, the active material layer can be formed so as to have a pattern such that the absolute value of the positional shifting between a boundary line between the actually formed active material layer and non-coated portion formed on the front surface of the collector and a boundary line between the actually formed active material layer and non-coated portion formed on the back surface of the collector is not more than 1 mm.

DETAILED DESCRIPTION OF PREFERRED EMBODIMENTS

Figure 1:
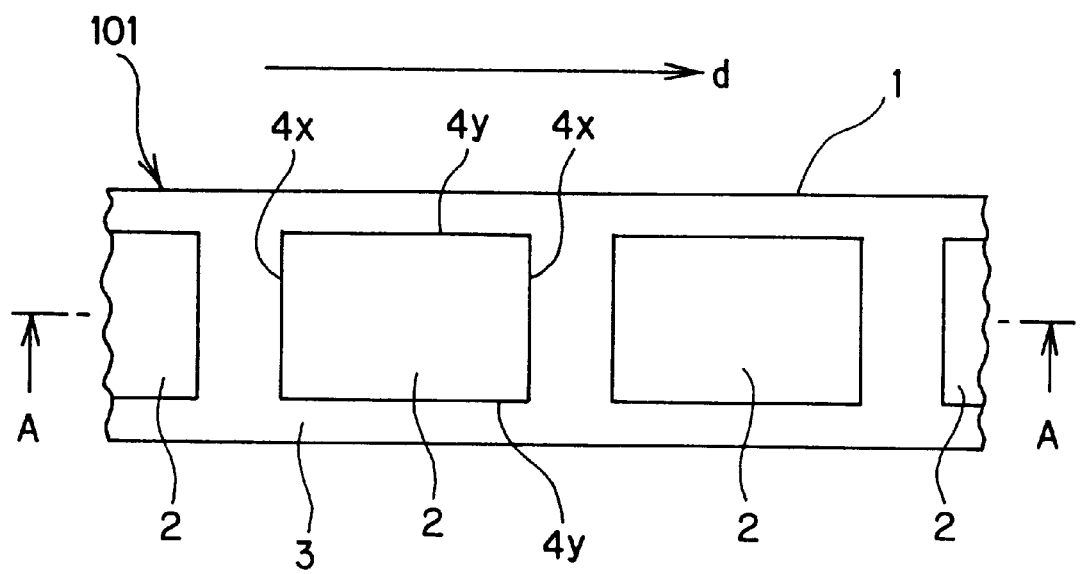
FIG. 1 is a plane view showing one example of an electrode plate according to the present invention.

Hereunder, the present invention will be described more in detail with reference to preferred embodiments. FIG. 1 is a plan view showing one preferred example (101) of an electrode plate according to the present invention. In the electrode plate 101 in FIG. 1, on one surface of a collector 1 having a long longitudinal dimension, there are formed active material layers 2 in a pattern in which rectangular shapes, each having a predetermined dimension, are repeatedly formed with equal distances. Each of the active material layers 2 is defined by edge portions 4x, 4x facing the arrangement direction d of the active material layers 2 and edge portions 4y, 4y being parallel to the arrangement direction d. An area of the electrode plate, to which the active material layer is not formed, is formed as non-coated (non-coating) portion 3 at which the surface of the collector is exposed. Accordingly, the pattern of the active material layers 2 and the pattern of the non-coated portion 3 have shapes complementary to each other.

Figure 2:
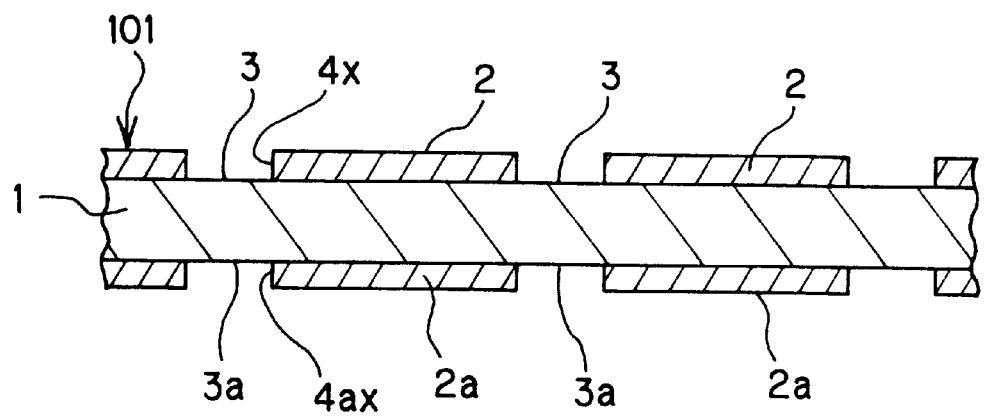
FIG. 2 is a sectional view of the electrode plate of FIG. 1 taken along the line A—A in FIG. 1.

FIG. 2 is an A—A section of the electrode plate 101 in FIG. 1. The active material layers 2a having a pattern identical to that mentioned above are also formed to another one surface of the electrode plate 101. The pattern of the active material layers 2 formed to the front surface of the electrode plate 101 and the pattern of the active material layers 2a formed to the back surface thereof are arranged in a plane symmetry with the collector 1 being interposed therebetween. The edge portions 4x of the active material layer 2 on the front surface and the edge portions 4ax of the active material layer 2a on the back surface have the same positional relationship. The non-coated portion 3 on the front surface of the electrode plate 101 and the non-coated portion 3a on the back surface thereof are also formed in the plane symmetry in their patterns with the collector 1 being interposed therebetween.

Figure 3:
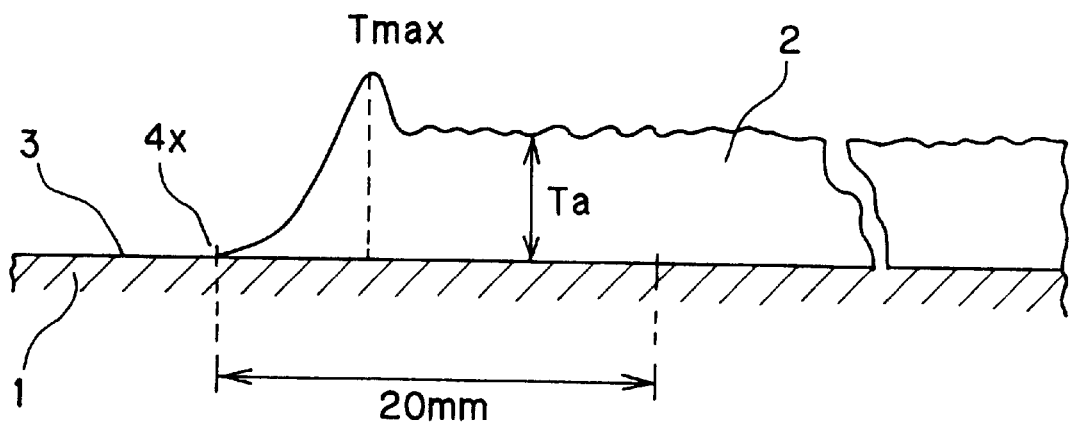
FIG. 3 is an enlarged partial view of the A—A section of the electrode plate of FIG. 1.

FIG. 3 is an enlarged view of a section of the electrode plate 101 taken along the line A—A in FIG. 1 and particularly schematically shows a portion near the edge portion 4x facing the arrangement direction of the active material layer 2. The maximum thickness (Tmax) of the active material layer 2 of the electrode plate 101 of the present invention at the peripheral edge portion thereof (an area inside by 20 mm from the edge portions 4x or 4y as the boundary portion between the non-coated portion 3 and the active material layer 2) is not more than the sum of an average thickness (Ta) and 10 μm (Ta+10μm). That is, the active material layer 2 of the electrode plate 101 satisfies the condition of the following Equation 1 and is not protruded (built up) at the peripheral edge portion thereof Further, in the case where the active material layers 2 are formed to both surfaces of the collector, it is preferred that the active material layers 2 on both the surfaces satisfy the condition of the Equation 1, respectively.

$$Tmax \leq Ta + 10 \ \mu m \qquad \text{(Equation 1)}$$

In this time, in a case where a horizontal resolving power at the thickness measuring time is too high, the magnitude of the thickness is made high because a particle shape on the surface of the active material layer 2 has been considered, and hence, the discrimination of the maximum thickness and the average thickness is made difficult. Accordingly, it is preferred to control the horizontal resolving power to about 0.1 mm to 1 mm, and in usual, a value measured with about 0.5 mm interval by using a contact type thickness meter (for example, "MICROFINE" manufactured by Union Tool K.K.) is utilized. Further, it is preferred that the average thickness of the active material layer 2 is calculated at portions except the peripheral edge portion thereof.

Figure 4:
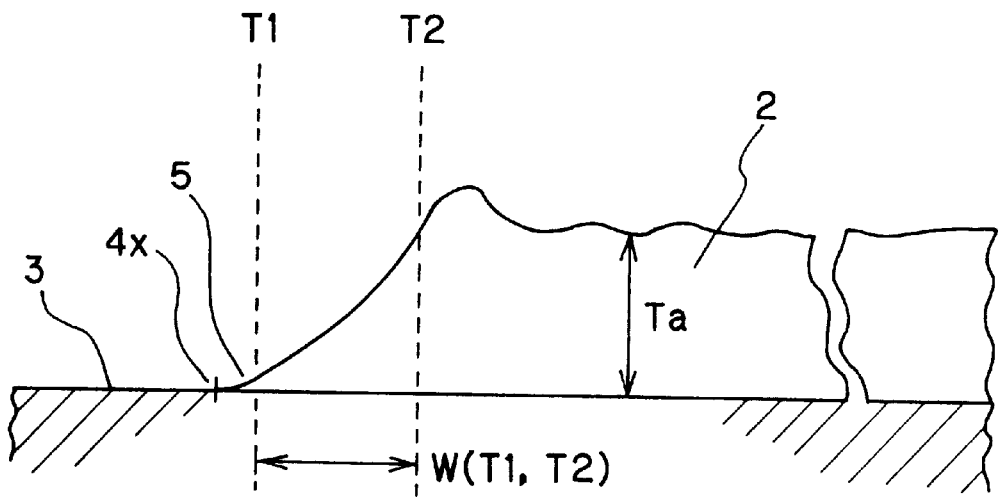
FIG. 4 is an enlarged partial view of the A—A section of the electrode plate of FIG. 1.

FIG. 4 is an enlarged view of a section of the electrode plate 101 taken along the line A—A in FIG. 1 and particularly schematically shows a portion near the edge portion 4x different from that of FIG. 3. In a case where there exists an inclining portion, at which the thickness increases from the edge portion 4x or 4y towards an inside portion of the active material layer 2, at the peripheral edge portion of the active material layer 2 of the electrode plate 101, a width W (T1, T2) of an area (i.e. an area from T1 to T2), at which the thickness of the active material layer 2 is not less than 1 μm and less than the average thickness (Ta) thereof, is not more than 1 mm. That is, the active material layer 2 of the electrode plate 101 satisfies the condition of the following Equation 2 and has a sharp built-up peripheral edge portion. Since the portion 5 having the thickness, of less than 1 μm, of the edge portion of the active material layer cannot be clearly distinguished from the non-coated portion, the width of the inclining portion can be evaluated in no consideration of this portion 5. Further, in the case where the active material layers are formed to both surfaces of the collector, it is preferred that the active material layers 2 on both the surfaces satisfy the condition of the Equation 2, respectively.

$$W(T1, T2) \leq 1 \ mm \qquad \text{(Equation 2)}$$

Figure 5:
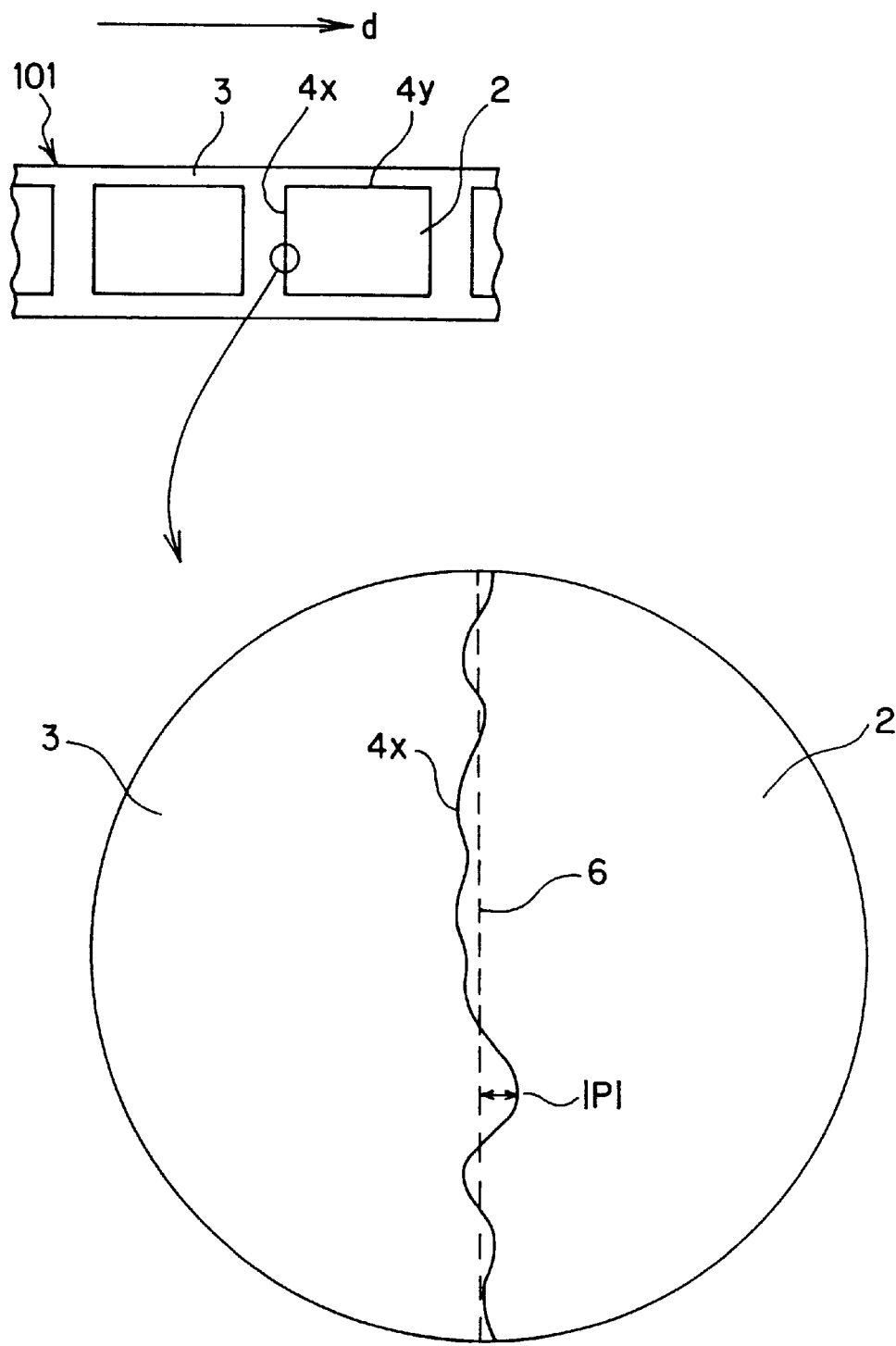
FIG. 5 is an enlarged plan view showing a boundary portion between an active material layer and a non-coated portion of the electrode plate of FIG. 1.

FIG. 5 is a plan view showing the electrode plate 101 of FIG. 1 in an enlarged scale, and particularly, a portion near the edge portion 4x facing the arrangement direction d of the active material layer 2 is enlarged. Although the edge portion 4x or 4y, which is the boundary portion between the active material layer 2 actually formed on the electrode plate 101 and the non-coated portion 3, is slightly waved, the absolute value |p| of a "shifting" from the actual boundary line 6 of the pattern which is initially aimed is not more than 1 mm, that is, satisfying the condition of the following Equation 3. Further, in the case where the active material layers are formed to both surfaces of the collector, it is preferred that the active material layers 2 on both the surfaces satisfy the condition of the Equation 3, respectively.

$$|p| \leq 1 \ mm \qquad \text{(Equation 3)}$$

Figure 6:
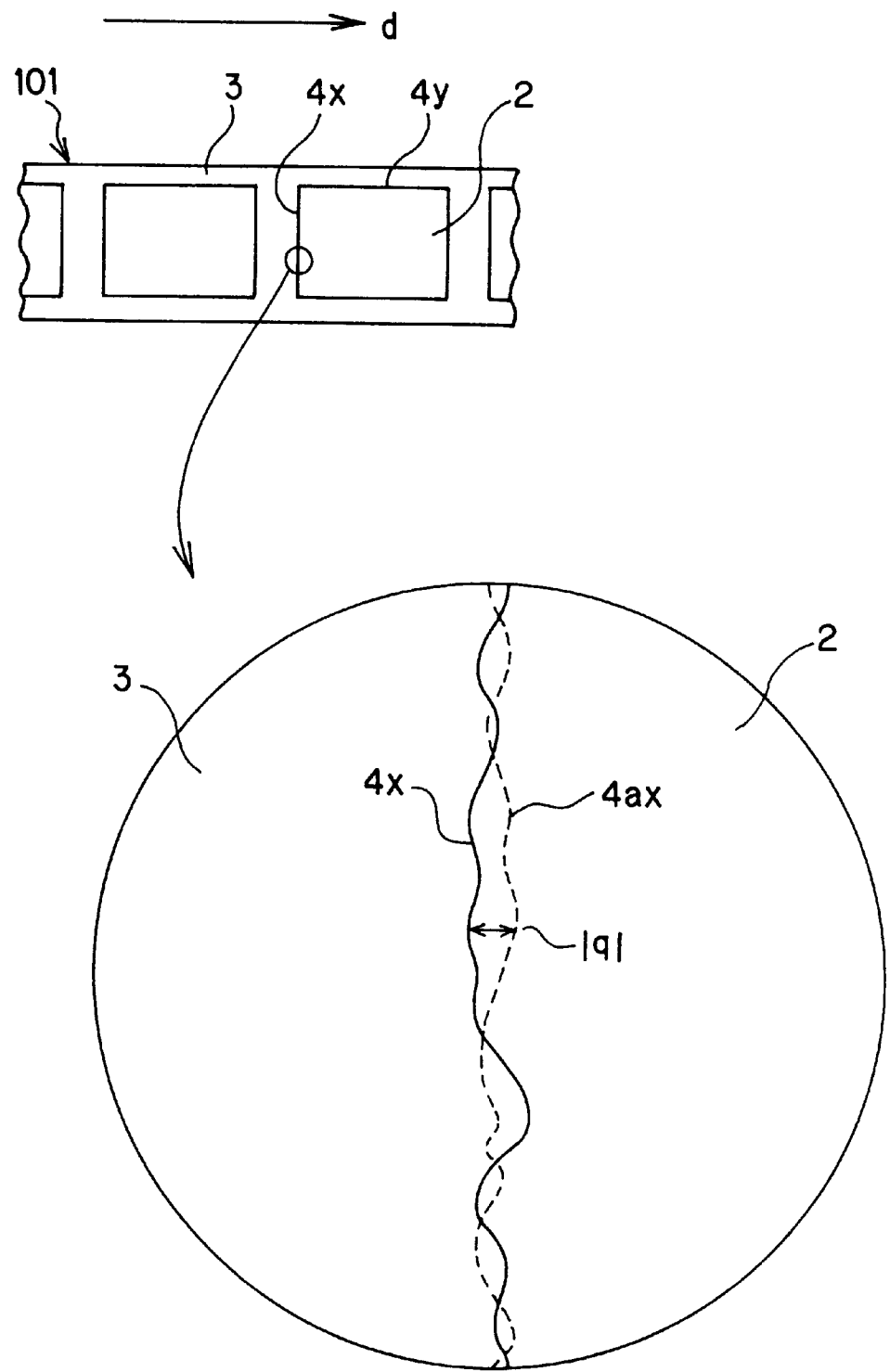
FIG. 6 is an enlarged plan view perspecting a boundary portion between an active material layer and a non-coated portion of the electrode plate of FIG. 1.

FIG. 6 is a plan view, in an enlarged scale, of the electrode plate 101 of FIG. 1, and particularly, is a view seeing through, from the upper side, a portion near the edge portion 4x facing the arrangement direction d of the active material layers 2. There is a positional shifting between the edge portion 4x or 4y as the boundary line between the active material layer 2 and the non-coated portion 3 actually formed on the front surface of the electrode 101 and the edge portion 4ax or 4ay as the boundary line between the active material layer 2a and the non-coated portion 3a actually formed on the back surface of the electrode 101. However, the absolute value |q| of this positional shifting is not more than 1 mm. That is, this satisfies the condition of the following Equation 4.

$$|q| \leq 1 \ mm \qquad \text{(Equation 4)}$$

In the case where the active material layer is formed by the conventional method in which a coater head is mechanically controlled, because the coating amount of the coating solution for the active material layer becomes locally excessive at the coating solution supply start position, a built-up portion is formed to the edge portion facing the arrangement direction of the active material layer, and hence, the condition of the Equation 1 mentioned above could not be satisfied. Furthermore, in the case where the active material layer is formed by the conventional method in which a coater head is mechanically controlled, because the coating amount of the coating solution for the active material becomes locally short at the coating solution supply stop position, a long inclination is formed to the edge portion facing the arrangement direction of the active material layer, and hence, the condition of the Equation 2 mentioned above could not be satisfied. Therefore, in the method in which the coater head is mechanically controlled, the thickness performance (dimension precision) of the active material layer at the portion near the edge portion 4x facing the arrangement direction of the active material layer 2 could not be made excellent as in the electrode 101 shown in FIG. 1.

Still furthermore, in the case where the active material layer is formed by the conventional method in which a coater head is mechanically controlled, because the tailing phenomenon of the active material layer is caused at the supply stop position of the coating solution for the active material layer, the edge portion facing the arrangement direction of the active material layer is waved, and hence, the conditions of the Equations 3 and 4 mentioned above could not be satisfied. Therefore, in the method in which the coater head is mechanically controlled, the positioning performance of edge portions 2x and 2ax facing the arrangement direction of the active material layers 2 and 2a could not be made excellent as in the electrode 101 shown in FIG. 1.

On the contrary, the electrode plate 101 according to the present invention satisfies at least one of the conditions of the Equations 1 to 4, and preferably, satisfies all the conditions of the Equations 1 to 4. Such electrode according to the present invention can be produced by the following methods.

Figure 7:
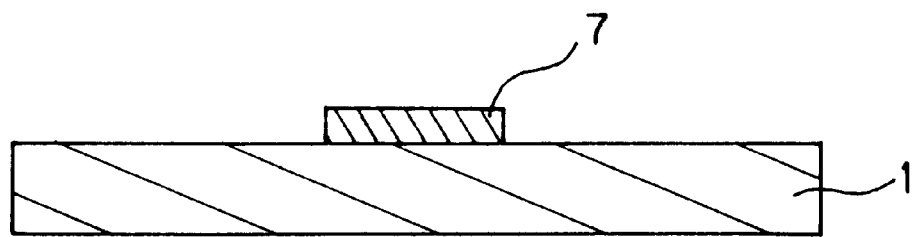
FIG. 7 is a view explaining one process for a method of a first embodiment for producing the electrode plate.

FIGS. 7 to 11 show main steps of one preferred example (first embodiment) of methods for producing the electrode plate according to the present invention. In the method of this first embodiment, as shown in FIG. 7, a high polymer resin layer 7 formed of a high polymer resin selected from the groups consisting of styrene-acrylonitrile, polymethyl-methacrylate and polydiisopropyl-fumarate, and derivatives thereof is first formed at an area of the surface of the collector in which it is required to form the non-coated position.

As the collector 1 as the substrate, a metal foil is usually used, and an aluminum foil and a copper foil are preferably used for the positive electrode plate and the negative electrode plate, respectively. These metal foils have usually a thickness of about 5 to 30 μm.

The high polymer resin formed of a high polymer resin selected from the groups consisting of styrene-acrylonitrile, polymethyl-methacrylate and polydiisopropyl-fumarate, and derivatives thereof is soluble by a solvent for a coating solution for the active material layer, which is mentioned hereinlater, and such high polymer resin is a material having a weak adhesion to the collector. As mentioned above, in the case where the high polymer resin layer is preliminarily formed to the portion of the surface of the collector in which the non-coated position is to be formed and the active material layer is then coated entirely on the same collector surface, the active material layer applied to the non-coated portion can be selectively peeled off. As the derivatives of styrene-acrylonitrile, polymethylmethacrylate and polydiisopropyl-fumarate, the followings will be pointed out: copolymer including other monomer or polymer in the main chain of the styrene-acrylonitrile, polymethyl-methacrylate and polydiisopropylfumarate; and material including substituent as side chain which is induced to the copolymer including other monomer or polymer in the main chain of the styreneacrylonitrile, polymethylmethacrylate and polydiisopropylfumarate, and as these copolymer and material, there are used ones which have not lost a function of making easy the selective peeling of the active material layer.

The high polymer resin layer can be formed by dissolving or dispersing the above-mentioned high polymer resin into a suitable solvent thereby to prepare a coating solution and then applying the coating solution to the collector surface in a predetermined pattern. As the solvent used for the preparation of the high polymer resin coating solution, a solvent same as or different from that for the coating solution for the active material layer may be utilized. More specifically, the high polymer resin can be dissolved or dispersed by using toluene or mixture solvent of toluene and ethyl-methyl-ketone (weight ratio of 1:1). Further, it may be possible to heat-melt the high polymer resin and then to coat the molten resin on the collector surface in the predetermined pattern.

In the case of coating the high polymer resin, there is usable a generally known coating apparatus such as gravure coater, gravure reverse e coater, roll coater, Mayer bar coater, blade coater, knife coater, air-knife coater, slot die coater, slide die coater, dip coater, nozzle coater, dispenser, die head or the like. Further, for example, it may be possible that, by attaching a dropping apparatus capable of dropping the coating solution at a predetermined timing to an X-Y axis plotter and operating the X-Y axis plotter in a manner similar to a case of describing letters or figures, the high polymer resin coating solution is dropped in an optional pattern in conformity with the motion of the X-Y axis plotter and then dried.

Further, the method which does not require the mechanical controlling of the coater head, for example, gravure coating method or gravure reverse coating method, it is possible to continuously form the desired pattern precisely at high speed, but these methods are limited in their use to the formation of relatively thin coating film. However, since the high polymer resin layer adequately achieves the required function with a small amount of the coating solution of about 0.2 to 3.0 g/m², it is possible to coat the coating solution of the high polymer resin on the collector surface by means of the gravure coating or the like, providing a superior productivity. Accordingly, in the case of coating the coating solution for the high polymer resin layer in the predetermined pattern, the coating can be done precisely at a speed higher than a speed in the case of coating the coating solution for the active material layer in the predetermined pattern.

Powder (powder material) may be dispersed in the high polymer resin layer 7. When it is required to roll out the collector for applying the coating solution for the active material layer after the high polymer resin layers are formed on both the side surfaces of the collector and then rolling up the collector in shape of roll, there may cause a case where the collector cannot be rolled out because of the mutual adhesion of the high polymer resin layers or a case where the high polymer resin layers adhere together and are peeled off from the collector. That is, blocking phenomenon will likely occur. However, in the case where the powder is dispersed in the high polymer resin layer, the powder acts to prevent such blocking and to provide a sliding property. Furthermore, by adding the powder, it will be expected to achieve an advantageous effect of further reducing the adhesion between the collector and the active material layer.

The powder material is dispersed into the solvent for preparing the coating solution containing the high polymer resin and exists as particle in the high polymer resin layer formed after the coating of the coating solution. There are provided, as preferred powders, for example, particles composed of material such as polytetrafluoroethylene (PTFE), polymethylmethacrylate (PMMA), styrene or cellulose fiber, in which the particle of polytetrafluoroethylene (PTFE) is most preferred. It is desired for the particle to have a particle size of about 0.1 to 1 μm. It is preferred to prepare the powder at a ratio of 1–80 weight parts with respect to 100 weight parts of the high polymer resin. In the case of less amount of the high polymer resin, it becomes difficult to form the coating film, whereas in the case of less amount of the powder, the blocking of the coated film will easily occur.

Figure 8:
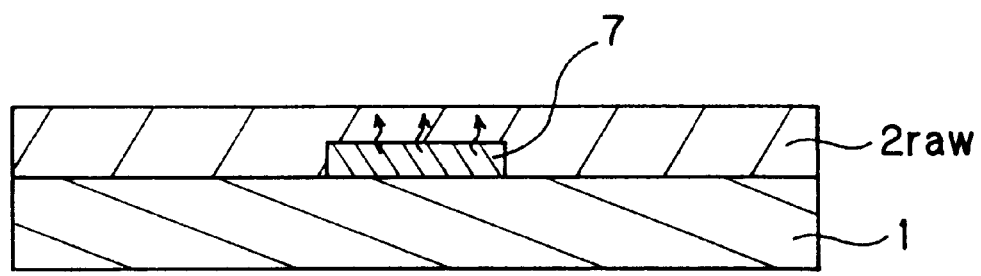
FIG. 8 is a view explaining one process for a method of a first embodiment for producing the electrode plate.
Figure 9:
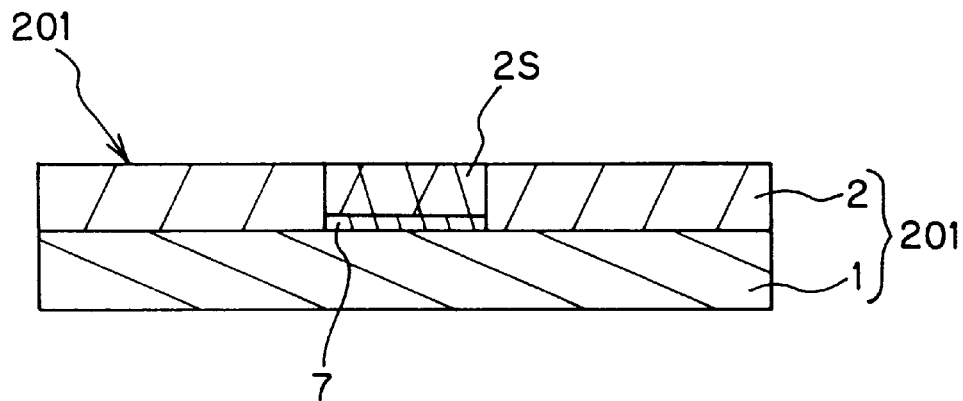
FIG. 9 is a view explaining one process for a method of a first embodiment for producing the electrode plate.

Next, as shown in FIG. 8, the coating solution for the active material layer at least containing the active material and the binder is coated entirely onto the surface of the collector on which the high polymer resin layer is formed, thus forming a coated (coating) layer 2raw, and when this coated layer 2raw is dried, the active material layer 2 is formed as shown in FIG. 9.

The active material layer contains at least the active material and the binder, and the active material includes a material for the positive electrode and a material for the negative electrode. As the material for the positive electrode, there may be used, for example, lithium oxides such as $LiCoO_2$, $LiNiO_2$, $LiMn_2O_4$ or the like, or chalcogen compound such as $TiS_2$, $MnO_2$, $MoO_3$, $V_2O_5$ or the like. These active materials for the positive electrode may be used alone or in combination of more than two kinds thereof. As the material for the negative electrode, it is preferred to use metallic lithium, lithium containing metal such as lithium alloy and carbonaceous material such as graphite, carbon black or acetylene black. Particularly, when the $LiCoO_2$ is used as the active material for the positive electrode and the carboneceous material is used as the active material for the negative electrode, it is possible to obtain a lithium secondary battery having a high discharge voltage of about 4 volt.

In order to uniformly disperse these active materials in the coating layer, it is desired for the active materials for the positive and negative electrodes to take a particle (powder) shape having a particle size in the range of 1 to 100 $\mu$m and having a mean particle size of about 10 $\mu$m.

Further, as the binding agent (binder), there is used, for example, a thermoplastic resin, and more specifically, polyester resin, polyamide resin, polyacrylic acid ester resin, polycarbonate resin, polyurethane resin, cellulose resin, polyolefin resin, polyvinyl resin, fluororesin or polyimide resin. In such case, it is possible to mix, into the binder, acrylate monomer or oligomer induced with reactive functional group. Other than the above materials, thermosetting resin such as rubber type resin, acrylic resin, urethane resin or the like, ionizing radiation-setting resin such as acrylate monomer, acrylate oligomer or the mixture thereof, or the mixture of these kinds of resins mentioned above. The fluororesin is preferably used as the binder and the polyvinyliden fluoride is most preferred therein.

The coating solution for the active material layer is prepared by mixing the active material, the binder and other composition as occasion demands. For example, the active material and the binder, which are appropriately selected, are mixed with an organic solvent such as toluene, methyl ethyl ketone, N-methyl-2-pyrrolidone or the mixture thereof, and a conductive agent is added therein as occasion demands to prepare a mixture. The thus prepared mixture is then dissolved or dispersed by using a dispersing apparatus such as homogenizer, ball mill, sand mill, roll mill or the like thereby to prepare the coating solution. It is preferred to set the compounding ratio in this time such that the total amount of the active material and the binder is of about 40 to 80 weight parts in the case of the entire coating solution of 100 weight parts. Further, as the compounding ratio of the active material and the binder, a conventional compounding ratio thereof will be adopted, and for example, it is preferred to prepare a weight ratio to be 5:5 to 9:1 (active material:binder) in the positive electrode plate and to prepare the weight ratio to be 8:2 to 9:1 (active material:binder) in the negative electrode plate. Further, as the conductive agent, there is used, as occasion demands, a carbonaceous material such as graphite, carbon black, acetylene black or the like.

The active material layer is formed by coating the thus prepared coating solution on the collector and then drying the same. Although the method of coating the coating solution for the active material layer is not specifically defined, for example, it is preferred to utilize a method capable of forming a thick coated layer such as slot die coating, slide die coating, comma reverse coating or the like. However, in a case where it is required to form an active material layer having relatively thin thickness, the coating solution may be coated by gravure coating, gravure reverse coating or the like. In the present invention, since it is not necessary to coat the coating solution for the active material in shape of pattern, it is not necessary to mechanically control the coater head even if the slot die coating, the slide die coating, comma reverse coating or the like be used.

As a heating source in the drying process, there may be utilized a hot wind, infrared ray, micro-wave, high frequency or combination thereof. Further, it may be possible to dry the coated solution by the heat radiation through heating of a metal roller or metal sheet for supporting or pressing the collector in the drying process. Further, the active material layer may be formed through a cross-linking reaction of the binder by the irradiation of electron beam or radiant ray after the drying process. Coating and drying may be repeated several times. The active material layer is formed so as to have a thickness in the range usually of 10 to 200 $\mu$m, preferably of 50 to 170 $\mu$m, after drying. Furthermore, it is desirable to remove water content in the active material layer by aging the obtained active material layer by means of vacuum oven or the like.

The uniformity of the active material layer can be improved by performing the press working to the obtained active material layer. The press working is performed by utilizing, for example, metal roll, elastic roll, heating roll, sheet pressing machine or the like. The pressing pressure is usually of 500 to 7500 $kgf/cm^2$, preferably of 3000 to 5000 $kgf/cm^2$. In the case of the pressing pressure of less than 500 $kgf/cm^2$, it is difficult to obtain the uniformity of the active material layer, and in the case of the pressing pressure of more than 7500 $kgf/cm^2$, there may cause a case where the electrode plate inclusive of the collector is damaged. The active material layer may be formed through one press working so as to have the predetermined thickness or through several times of the press working in order to improve the uniformity.

In a case of controlling the pressing pressure of the roll press with a linear pressure, the pressing pressure is adjusted in accordance with the diameter of the press roll usually with the linear pressure of 0.5 kgf/cm to 1 tf/cm. In further consideration of the thickness of the electrode plate after the pressing, the pressing may be separately performed in several times.

Furthermore, the surface of the active material layer may be made flat by compressively bonding, with light force, a film having a flat surface such as polyethylene-terephtharate film or the like to the surface of the active material layer and then peeling off the same during the drying process of the active material layer.

The coated layer 2*raw* of the coating solution for the active material layer is undried and contains the solvent for a little time after the coating on the collector. On the other hand, as mentioned hereinbefore, the high polymer resin layer 7 is soluble to the solvent for the coating solution of the active material layer. For this reason, during the progressing of the drying of the coated layer 2*raw*, the high polymer resin forming the high polymer resin layer 7 is gradually dissolved, as shown in FIG. 8, transferred to the coated layer 2*raw*, and then solidified again in the coated layer 2*raw*. The high polymer resin transferred into the coated layer 2*raw* infiltrates in an upward direction of the coated layer 2*raw*. This fact is assumed by the reason that the solvent component in the coated layer 2*raw* is evaporated into air from the surface of the coated layer 2*raw*, and as a result, the high polymer resin is pulled upward in the coated layer 2*raw*.

According to this manner, the high polymer resin is impregnated (infiltrated) only into the active material layer in an area to which the non-coated portion is to be formed.

When the drying process of the coated layer 2raw containing the active material and the dissolving, transferring and impregnating processes of the high polymer resin progress in parallel to each other and these processes have been completed, an intermediate product 201 (i.e. intermediate product of the electrode plate) of the electrode 101 can be obtained as shown in FIG. 9. In the intermediate product 201, the high polymer resin is impregnated and solidified only in the active material layer 2s in the area to which the non-coated portion is to be formed. The active material layer 2s in this area is bonded by the binder initially contained in the coating solution for the active material layer and the high polymer resin, so that it has high cohesive force in comparison with the active material layer, around this area, in which the active material layer is bonded only by the binder, and therefore, it becomes peelable from the collector.

Furthermore, as shown in FIG. 9, the high polymer resin layer 7 remains usually without completely having been absorbed in the active material layer and still exists between the collector 1 in the area to which the non-coated portion is to be formed and the dried active material layer 2s. Because of this reason, the peelability of the active material layer 2s from the collector 1 can be improved by the existence of the high polymer resin layer 7 having weak adhesion.

Figure 10:
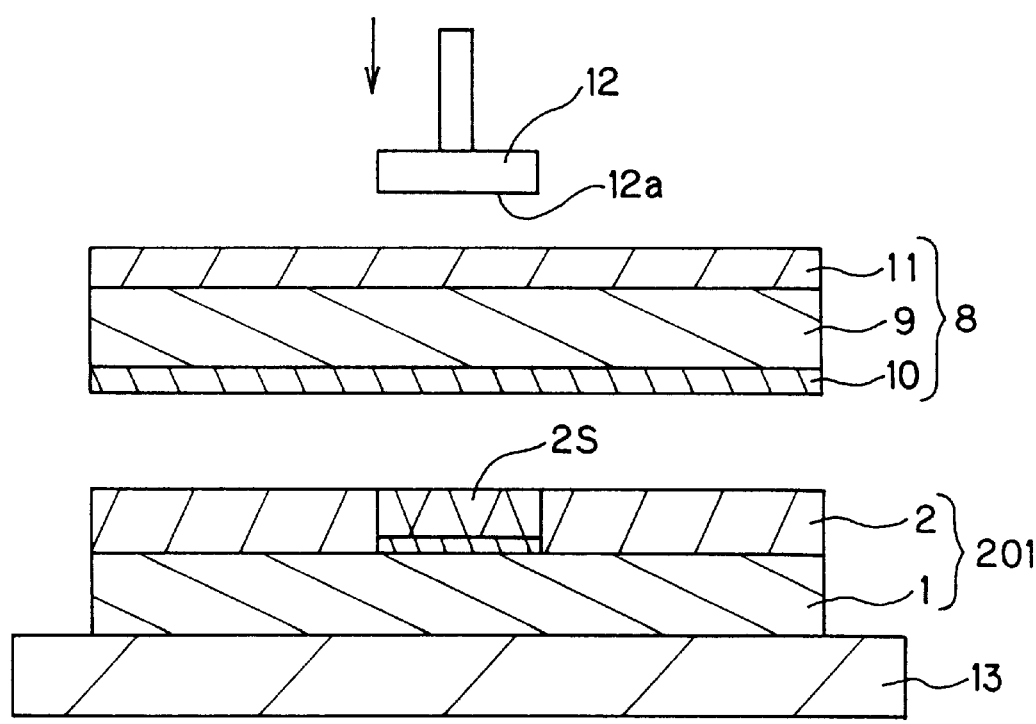
FIG. 10 is a view explaining one process for a method of a first embodiment for producing the electrode plate.
Figure 13:
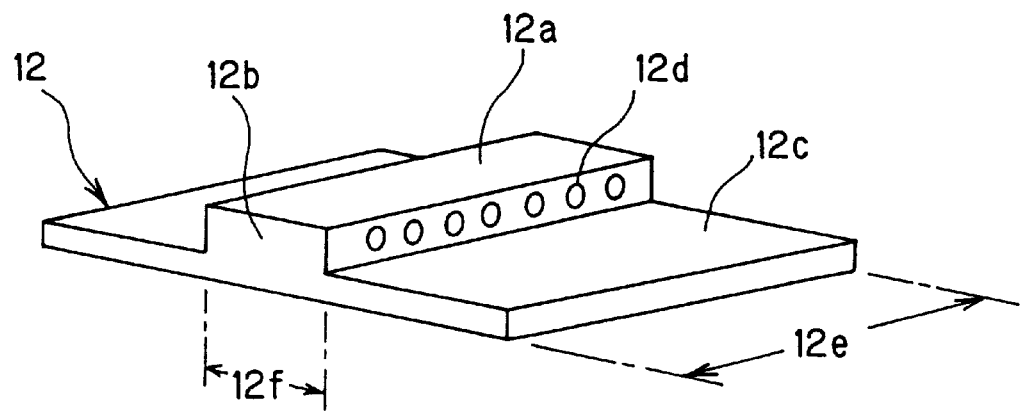
FIG. 13 is a perspective view showing one example of a hot plate used for the method of the present invention.

Next, as shown in FIG. 10, the intermediate product 201 of the electrode 101 is placed on a support table 13, and a thermoplastic resin sheet 8 or a thermoplastic resin product (not shown) is selectively thermo-compressively bonded (heat pressed) on the surface of the active material layer in the area in which the non-coated portion is to be formed, i.e. in which the high polymer resin layer 7 exists. In the case of the press adhesion of the thermoplastic resin sheet 8, a hot plate 12 having a pressing surface 12a having a pattern of the same shape as that of the area pattern in which the non-coated portion is to be formed is positioned and then abutted from the back side of the thermoplastic resin sheet 8. FIG. 13 is a perspective view showing one example of the hot plate 12. The hot plate 12 has a structure that a built-up (protruded) portion 12b is formed to one surface side of a base portion 12c of the hot plate 12 so that the protruded portion 12b forms the pressing surface 12a. The hot plate 12 is provided with a temperature sensor and a heater to uniformly keep an appropriate heating temperature, and in this example, the temperature sensor and the heater are embedded into holes 12d formed to portions directly below the pressing surface with equal distance from each other. By preparing several hot plates which have base portions 12c having the same shape and dimension and which have different shapes and dimensions of the pressing surfaces 12a, the mounting and exchanging of the heat plates to the same pressing machine can be easily performed, and therefore, the adjustment of the pressing machine can be instantaneously completed in accordance with the desired shape and size of the non-coated portion.

Further, when the thermoplastic resin product is heat pressed, a pressing surface of the thermoplastic resin product is formed so as to provide the same pattern as that of the area in which the non-coated portion is to be formed and the product is then pressed against the active material layer.

It is preferred that, by setting the pressing surfaces of the hot plate 12 and the thermoplastic resin product so as to have the same dimension as that of the area in which the non-coated portion is to be formed or to have a narrow dimension by about 0.5 mm in all directions, a pattern having high dimensional precision can be formed. For example, in the case of using the hot plate 12 shown in FIG. 13, it is preferred to make the longitudinal dimension 9e and the cross-directional dimension 9f of the pressing surface equal to or shorter, by about 5 mm, than those of the area in which the non-coated portion is to be formed.

In order to making coincident, in position, the pressing surface of the hot plate 12 or thermoplastic resin product with the area in which the non-coated portion is to be formed, a certain detection mark for position alignment may be provided to the electrode plate before the peeling process. For this purpose, by adding a coloring matter to the high polymer resin layer, the high polymer resin layer is itself utilized as the detection mark for the position alignment. The colored high polymer resin layer can be made perspective through the active material layer, and furthermore, when the coating solution for the active material layer is coated on the colored high polymer resin layer, the coloring agent together with the high polymer resin is dissolved and impregnated into the undried coated layer containing the active material thereby to color the active material layer, so that the portion to which the high polymer resin layer is formed, i.e. area in which the non-coated portion is to be formed, can be detected from the upper side of the active material layer.

It is preferred that the coloring agent is soluble into the solvent for dissolving or dispersing the high polymer resin as well as soluble into the coating solution for the active material layer. Since the copper foil collector has a color near red color, the collector will not appear when a red coloring agent is used and there is a possibility of being difficult to be detected. Then, in the case of using the copper collector, it is preferred to use blue or black coloring agent. Because of the same reason, in a case where, with respect to the positive electrode collector and the negative electrode collector, the same high polymer resin solution is used, it is preferred to add the blue or black coloring agent to the high polymer resin solution so as not to cause a problem even if the negative electrode collector is the copper foil.

It is essential for the thermoplastic resin sheet 8 to be provided with a thermoplastic resin layer 9 which can be impregnated into the active material layer, and a single-layer film of the thermoplastic resin may be used. The shown thermoplastic resin sheet 8 has three-layer structure and the pressing surface of the thermoplastic resin layer 9 is coated with a wax layer 10 for effectively performing the peeling process. On the other hand, on the back surface of the thermoplastic resin sheet 8, a heat-resisting layer 11 is formed so as to prevent the fusion to the hot plate. However, it may be possible to first selectively impregnate the molten wax into an area having the active material layer to be peeled off and then to thermally selectively fuse the single-layer film of the thermoplastic resin to the same area. Further, a heat-resisting sheet may be interposed between the single-layer film of the thermoplastic resin and the hot plate.

As a material for forming the thermoplastic resin layer 9 of the thermoplastic resin sheet 8, a thermoplastic resin conventionally used as a heat seal material such as polyolefin resin, EVA or the like is preferably used, and a material having not so strong adhesion to the collector formed of aluminum foil or copper foil is preferabl. Furthermore, it is also preferred that the material has a softening point of 70 to 150° C. and a melting point of about 100 to 160° C. and has a melt flow rate (MFR unit (g/10 min), 190 to 230° C.) of about 0.1 to 50.

Although there is no specific limit for the thickness of the thermoplastic resin layer 9 of the thermoplastic resin sheet 8, the thickness is usually 10 to 200 $\mu$m, and more preferably, 25 to 100 µm. In the case of the thermoplastic resin being too thin, it is difficult to sufficiently remove the active material layer 2s at the area forming the non-coated portion, and on the contrary, in the case of being too thick, it is difficult to form the active material layer 2s providing a pattern having a sharp shape.

Because the wax component has a fluidity larger than that of the thermoplastic resin, it likely reaches a deep portion of the active material layer 2s. For this reason, by preliminarily impregnating the wax into the active material layer 2s in the area to be formed as the non-coated portion and then thermo-compressively bonding the thermoplastic resin sheet or product, the thermoplastic resin is impregnated in a manner that the wax previously existing in voids of the active material layer 2s is pushed in, or the wax distributed in the deep portion in the active material layer is contacted to the thermoplastic resin, thereby to completely remove the active material layer 2s in the impregnated portion. For this reason, the active material layer can be effectively peeled off with reduced working times by the compatible use of the wax. Particularly, in a case where the active material layer has already been subjected to the press treatment and it is difficult to impregnate the thermoplastic resin, it is more effective to compatibly use the wax.

As a method of selectively impregnating the wax into the portion of the active material layer 2s which is to be peeled off, there will be adopted a method of gravure coating of a molten wax, a method using a die coater, a coating method using a rotary screen, a method of forming the wax having film-forming property into a film shape, then thermo-compressively bonding and impregnating it to the active material layer 2s, a method of transferring the wax impregnated in a non-woven fabric or paper to the active material layer 2s by means of heat pressing, or the like method.

Still furthermore, as shown in FIG. 10, it may be possible to use a composite sheet, as the thermoplastic resin sheet 8, formed by preliminarily laminating the thermoplastic resin layer 9 and the wax layer 10 and then to impregnate the wax of the wax layer 10 at the time of thermo-compression bonding.

As the wax used in the present invention, there is usable a material which is easily molten by the heating process such as polyethylene wax having low molecular weight, polypropylene wax or their derivatives, or various kinds of natural wax. For the precise patterning of the active material layers, it is preferred to use the wax having low adhesion to the collector 1 and having less volume change at the solidifying time.

As the wax, there is used a wax usually having a melting point of 20 to 250° C., and preferably, of about 60 to 150° C. In the case of low melting point, the wax is too softened to be treated at a room temperature and the productivity thereof is not good, hence being not available. In the case of high low melting point, it is not economical in the viewpoint of energy and, moreover, there is a fear of damaging the collector 1 as the substrate at the time of being impregnated into the active material layer. A melt viscosity of the wax is about 100 to 50,000 cps, and preferably, about 400 to 6,000 cps. In the case of high melt viscosity, it is not economical in the viewpoint of energy, and in the case of low melt viscosity, the wax is easily developed in the transverse direction at the time of being impregnated into the active material layer, thus being difficult to carry out the exact patterning.

As the polyethylene wax or polypropylene wax as preferred examples of the wax mentioned above, there are used waxes of non-oxidation low density type, non-oxidation intermediate density type, non-oxidation high density type, oxidation low density type, oxidation intermediate density type, oxidation high density type, non-polarized type, polarized type, powder type and the like, which are suitable for the present invention.

The heat-resisting layer 11 formed to the back surface of the thermoplastic resin sheet 8 or thermoplastic resin sheet is mainly composed of a heat-resisting resin such as polyethylene-terephthalate, polyimide, polyphenylene-sulfide or the like. Further, in a case where a heat-resisting sheet in a separate form is used, it is preferred that the heat-resisting sheet has a thickness of about 10 to 100 µm, and more preferably, of about 12 to 50 µm for the reason of patterning in a sharp shape.

As the conditions for the thermo-compression bonding, the temperature is preferably of 100 to 150° C., the pressure is preferably of 2 to 10 kgf/cm$^2$, the compression bonding time is preferably of not over than 5 seconds. However, the present invention is not limited to these conditions.

Figure 11:
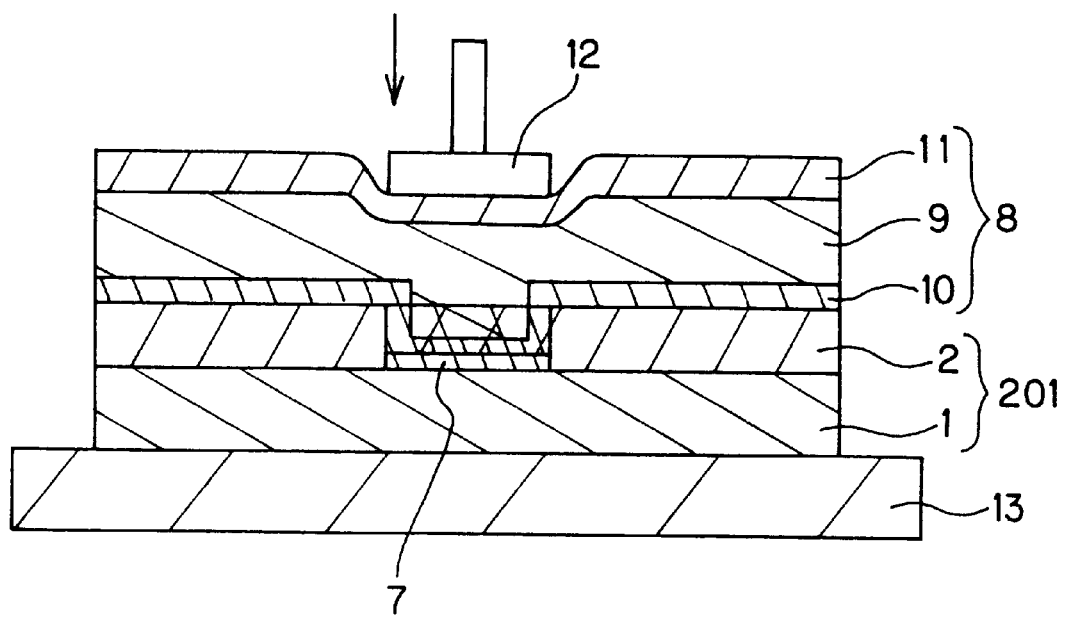
FIG. 11 is a view explaining one process for a method of a first embodiment for producing the electrode plate.

By effecting such thermo-compression bonding, as shown in FIG. 11, the wax layer 10 and the thermoplastic resin layer 9 of the thermoplastic resin sheet 8 of the portion being subjected to the thermo-compression bonding are softened or molten, and these layers are then impregnated into the void in the active material layer 2s in the area in which the non-coated portion is to be formed. At this time, the wax is impregnated into an area deeper than the area in which the thermoplastic resin is impregnated.

Figure 12:
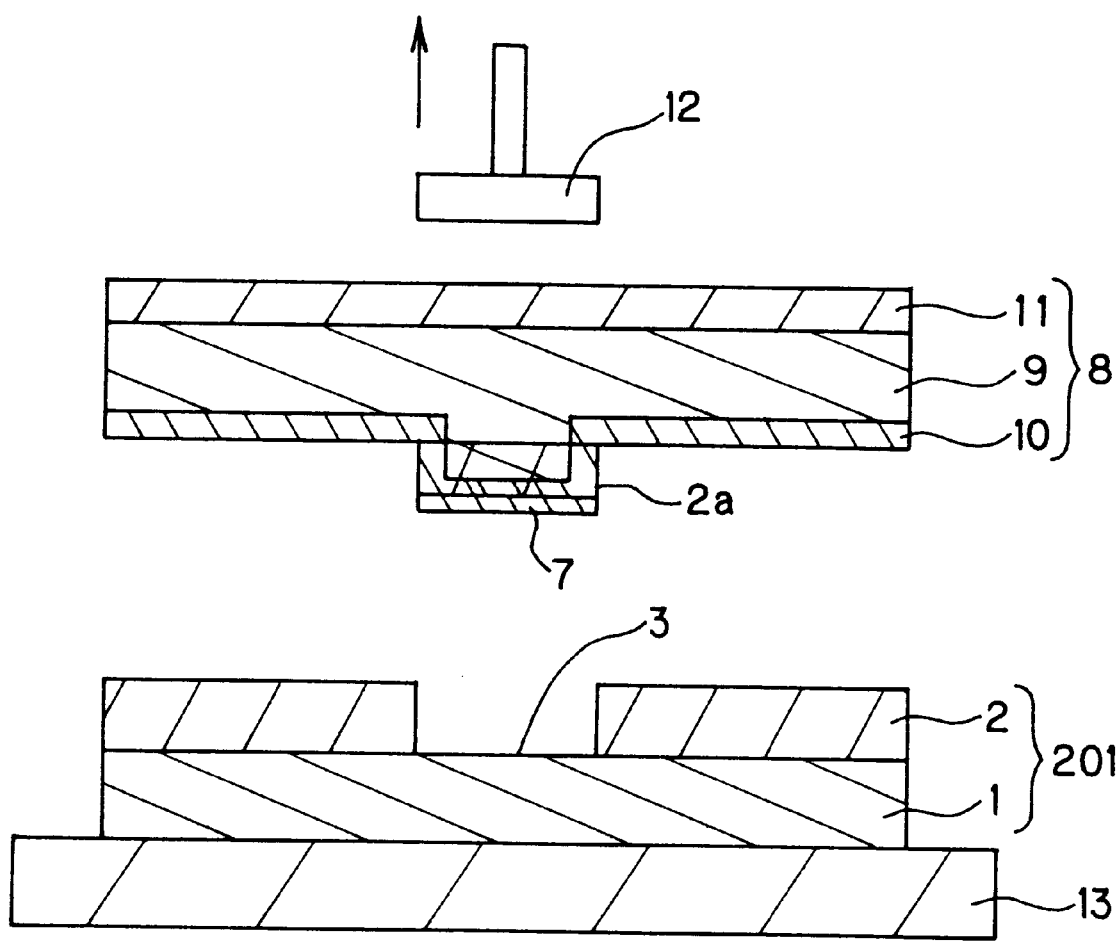
FIG. 12 is a view explaining one process for a method of a first embodiment for producing the electrode plate.

Next, the wax and the resin impregnated into the active material layer 2s are solidified by removing the hot plate 12 and naturally or forcibly cooling the intermediate product 201. Then, the thermoplastic resin sheet 8 or product is secured to the surface of the active material layer 2s in the area in which the non-coated portion is to be formed. At this time, the high polymer resin transferred from the high polymer resin layer 7 and the thermoplastic resin transferred from the thermoplastic resin sheet 8 or product are impregnated into the active material layer 2s in the area in which the non-coated portion is to be formed, and preferably, the wax is also impregnated. For this reason, the cohesive force of the active material layer 2s of this portion is made vary high in comparison with that of its surrounding portion. -Further, the high polymer resin layer 7 having a weak adhesion exists between the active material layer 2s and the collector 1. For this reason, as shown in FIG. 12, when the thermoplastic resin sheet 8 or product (not shown) is peeled and removed, the active material layer 2s in the area in which the non-coated portion is to be formed and the high polymer resin layer 7 are removed together with the thermoplastic resin sheet 8, and the active material layer in the area surrounding the area in which the non-coated portion is to be formed remains on the collector as it is. In the manner mentioned above, the non-coated portion 3, in which the collector surface is exposed, and the active material layer 2 having a pattern complementary to the pattern of the non-coated portion 3 are formed, thus obtaining the electrode plate 101.

In a case where the the thermoplastic resin does not reach an adequately deep portion of the active material layer 2s, there may cause a case that the peeling has not been completed by one time of working. In such case, the active material layer 2s at the unnecessary portion can be completely removed by repeating several times the processes including the thermo-compression bonding, cooling and peeling processes. Further, in such case, it may be possible to change the kind of the thermoplastic resin sheet.

According to the method mentioned above, since the non-coated (non-coating) portion is formed by forming the active material layer in form of solid pattern on the collector and then selectively peeling off the active material layer in conformity with the predetermined pattern, any built-up or inclined portion is not formed to the edge portion of the active material layer, which is different from the case where the pattern is formed under the mechanical control of the coater head. Furthermore, in comparison with the case where the coater head is mechanically controlled, the edge portion of the active material layer can provide the high positional precision. Still furthermore, in the case where the active material layer is peeled off by the method of the present invention, different from a conventional case wherein a knife or the like is used, the edge portion of the active material layer can be smoothly formed and production of powder at the edge portion is substantially not caused. Furthermore, in the present invention, by performing the patterning after the full-surface pressing, the operation speed of the press can be made high, yielding can be improved, and it is expected to avoid occurrence of a damage to the pattern edge portion by the pressing.

Figure 14:
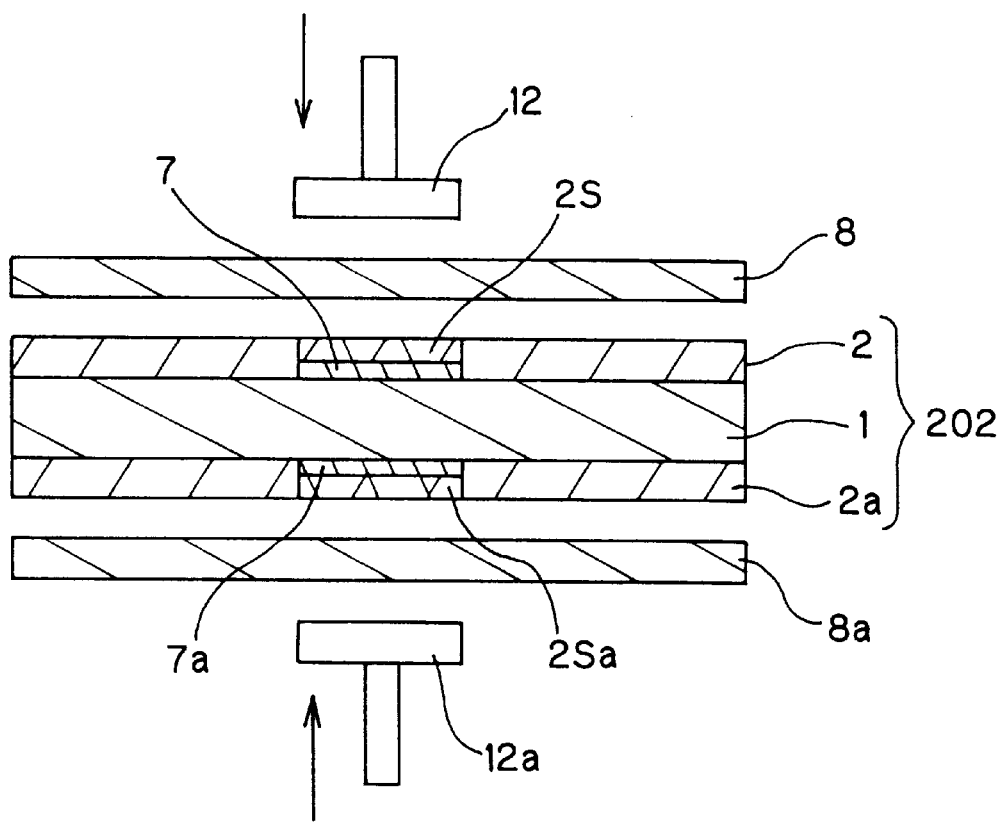
FIG. 14 is a view explaining a method of a second embodiment for producing the electrode plate.

By applying the above method of the present invention to both the front and back surfaces of the collector, the patterns of the active material layers and the non-coated portions can be formed to the both surface. In such case, it may be possible to coat the high polymer resin layers on the front and back surfaces of the collector with materials different from each other. Further, the active material layers and the non-coated portions are formed to the front and back surfaces of the collector at the same pattern or different patterns as occasion demands. Particularly, according to the present invention, it is possible to easily form the active material layers, on both the surfaces of the collector, having plane symmetry patterns with the collector being interposed. FIG. 14 shows one preferred process (second embodiment) for forming the active material layers having such plane symmetry patterns. Materials and coating manner or process, or other conditions used in the method of this second embodiment are basically the same as those used in the first embodiment. With reference to FIG. 14, the specific points of the second embodiment will be mainly described hereunder. First, areas in which the non-coated (non-coating) portions are to be formed are set to both the surfaces of the collector 1 in the plane symmetry shape, and the high polymer resin layers 7 and 7a are formed, to these areas, of the high polymer resin selected from the group consisting of styrene-acrylonitrile, polymethylmethacryrate or polydiisopropyl-fumarate, or derivatives thereof.

Next, an intermediate product 202 of the electrode plate is formed by forming the active material layers 2 through the coating of the coating solution for the active material layers on both the surfaces of the collector 1. In the intermediate product 202, the high polymer resin transferred from the high polymer resin layers are impregnated into the active material layers 2s and 2sa in the areas in which the non-coated portions are to be formed and then solidified therein. The active material layers 2s and 2sa in these areas are formed to the collector 1 through the high polymer resin layers 7 and 7a having weak adhesion.

Next, two thermoplastic resin sheets 8 and 8a and a pair of hot plates 12 and 12a having pressing surfaces having symmetric shapes with each other are prepared. The respective thermoplastic resin sheets 8 and 8a are laminated on both the surfaces of the intermediate product 202 of the electrode, and thereafter, both the surfaces of the thermoplastic resin sheets are simultaneously thermo-compressively bonded by clamping the intermediate product between the paired hot plates 12 and 12a. Further, a similar thermo-compression bonding may be performed, in place of the hot plates, by using a pair of thermoplastic resin products having symmetric pressing surfaces. As mentioned above, by pressing the intermediate product between the paired thermoplastic resin sheets or between the paired thermoplastic resin products, the positional alignment of both the surfaces can be simultaneously made, thus providing good efficiency, and the positional shifting of the respective patterns on both the surfaces are made hard to be caused.

After the thermo-compression bonding, the intermediate product 202 of the electrode is cooled thereby to secure the thermoplastic resin sheets 8 and 8a or thermoplastic resin products to the portions of the active material layers 2s and 2sa. Then, by peeling off the thermoplastic resin sheets 8 and 8a or thermoplastic resin products from the intermediate product 202, the non-coated portions having plane symmetry are formed on both the front and back surfaces of the intermediate product. According to this method, it is made possible to extremely reduce the positional shifting between the boundary line between the active material layer and the non-coated portion formed on the front surface of the collector and the boundary line between the active material layer and the non-coated portion actually formed on the back surface of the collector. Therefore, according to this method, the condition of the Equation (4) mentioned before can be satisfied.

In the method of the present invention mentioned above, it may be possible to coat the active material layer after the preliminary selective formation of the adhesive layer in the area of the surface of the collector in which the pattern of the active material layer is to be formed. FIGS. 15 to 19 show main processes of one preferred example (third embodiment) of the method utilizing such adhesive layer. In the method of this third embodiment, materials to be used, methods or processes for the coating, or other conditions are basically substantially the same as those in the first embodiment.

Figure 15:
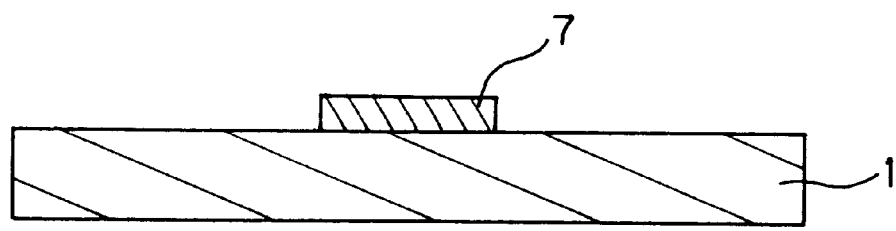
FIG. 15 is a view explaining one process for a method of a third embodiment for producing the electrode plate.

According to this third embodiment, first, as shown in FIG. 15, the high polymer resin layer 7 formed of a high polymer resin selected from the group consisting of styerene-acrylonitrile, polymethylmethacryrate or polydiisopropyl-fumarate, or derivatives thereof is formed in the area of the collector in which the non-coated portion is to be formed.

Figure 16:
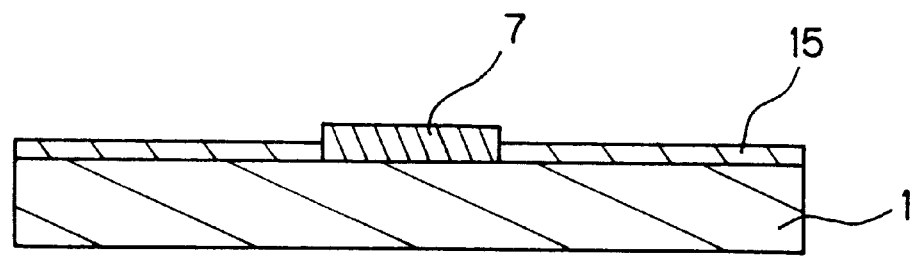
FIG. 16 is a view explaining one process for a method of a third embodiment for producing the electrode plate.
Figure 21A:
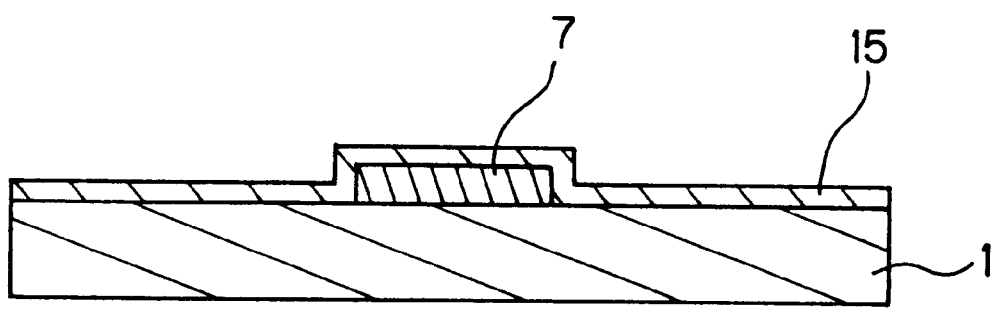
FIG. 21 includes 21A and 21B being views respectively explaining modified examples of methods of forming adhesive layers on a collector.
Figure 21B:
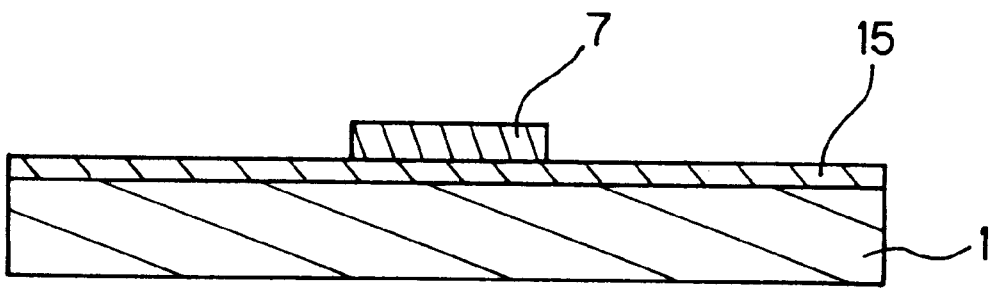

Next, as shown in FIG. 16, the adhesive layer 15 is formed by selectively coating the adhesive to the area of the surface of the collector in which the active material layer is to be formed. Further, it may be possible to form the high polymer resin layer 7 in the area of the collector in which the non-coated portion is to be formed after the formation of the adhesive layer 15 to the area of the collector in which the active material layer is to be formed. Furthermore, as shown in FIG. 21A, it may be also possible to form the adhesive layer 15 to the entire surface of the collector so as to entirely cover the high polymer resin layer 7 after the formation of the high polymer resin layer 7 to the area of the collector in which the non-coated portion is to be formed. Still furthermore, as shown in FIG. 21B, it may be possible to form the high polymer resin layer 7 through the adhesive layer 15 to the area of the surface of the collector in which the non-coated portion is to be formed after the formation of the adhesive layer 15 on the entire surface of the collector.

The adhesive layer 15 is formed to increase the adhesion property of the active material layer in the area of the collector surface in which the active material layer is to be formed. As the adhesive for forming the adhesive layer, there are used, for example, various kinds of coupling agents such as silane series, titanate series, aluminum series or the like.

The silane-coupling agent may be exemplified, for example, by γ-(2-aminoethyl)aminopropyl trimethoxy silane, γ-(2-aminoethyl)aminopropyl methyldimethoxy silane, β-(3,4-epoxycyclohexyl) ethyltrimethoxy silane, γ-aminopropyl triethoxy silane, γ-methacryloxypropyl trimethoxy silane, N-β-(N-vinylbenzyl aminoetyl)-γ-aminopropyl trimethoxy silane.hydrochloric acid salt, γ-glycidoxypropyl trimethoxy silane, aminosilane, γ-mercaptopropyl trimethoxy silane, methyl trimethoxy silane, methyl triethoxy silane, vinyltriacetoxy silane, γ-chloropropyl trimethoxy silane, hexamethyldisilazane, γ-anilinopropyl trimethoxy silane, vinyltrimethoxy silane, vinyltriethoxy silane, vinyl tris(β-methoxy ethoxy)silane, octadecyldimethyl [3-(trimethoxysilyl)propyl]ammonium chloride, γ-chloropropyl methyl dimethoxy silane, γ-mercaptopropyl methyl dimethoxy silane, methyltrichloro silane, dimethyl dichloro silane and trimethylchloro silane.

The titanate-coupling agent may be exemplified, for example, by isopropyl triisostearoyl titanate, isopropyl tridodecylbenzenesulfonyl titanate, isopropyl tris(dioctylpyrophosphate)titanate, tetraisopropyl bis(dioctylphosphite)titanate, tetraoctyl bis(ditridecylphosphite)titanate, tetra(2,2-diallyloxymethyl)bis(ditridecyl)phosphite titanate, bis(dioctylpyrophohate) oxyacetate titanate, bis(dioctylpyrophosphate)ethylene titanate, isopropyltrioctanoyl titanate, isopropyl dimethacryl isostearoyl titanate, isopropyl isostearoyl diacryl titanate, isopropyl tri(dioctylphosphate)titanate, isopropyl tricumylphenyl titanate, isopropyl tri(N-aminoethyl.aminoethyl)titanate, dicumyl phenyloxyacetate titanate and diisostearoylethylene titanate.

The aluminum-coupling agent may be exemplified, for example, by acetoalkoxyaluminum diisopropylate.

In the case where the copper foil is used as the collector 1, carboxylic acid or sulfonic acid may be effectively utilized as the adhesive other than the above-mentioned various kind of coupling agents. The carboxylic acid and the sulfonic acid may have functional group or substitutional group together with carboxylic group or sulfonic group as a side chain or a portion of a main chain. Further, the carboxylic acid or sulfonic acid may have high polymer form. The adhesive preferred for improving the adhesion property of the copper foil collector is a silane coupling agent having, as end group, amino group, mercapto group or vinylbenzylaminoethyl group, or oxalic acid, in which the silane coupling agent having amino group as end group or oxalic acid are particularly desirable.

The adhesive layer is formed by selectively coating a solution, prepared by dissolving such adhesive in water, organic solvent or water/organic solvent mixture solution on the area of the collector surface in which the active material layer is to be formed and then drying the coated solution. The coating amount of the adhesive layer is preferred to be 0.001 to 5 g/m² at the dried time.

When the coupling agent is used as the adhesive, the coupling agent is usually dissolved in the organic solvent or water/organic solvent mixture solution to obtain a coating solution. In order to promote the hydrolysis of the coupling agent, it may be better to prepare pH of the coating solution to a value of 3 to 5. Further, as a catalyst for the hydrolysis of the coupling agent, there may be added, for example, hydrochloric acid, acetic acid or the like. Still furthermore, in order to promote dehydration reaction between the coupling agent and the collector surface, the coupling agent is applied on the surface of the collector and then the applied coupling agent may be heated at a temperature of 120 to 130° C. As a solvent for dissolving the coupling agent, there may be used, for example, methanol, ethanol, isopropyl alcohol, toluene, benzene, acetone, tetrahydrofuran, cellosolve methyl or the like.

When the carboxylic acid or sulfonic acid is used as the adhesive, the carboxylic acid or sulfonic acid is usually dissolved in the organic solvent to obtain a coating solution. In order to promote the drying of the coating solution, the coated layer may be heated at a temperature of 120 to 130° C. after the coating. As a solvent for dissolving the carboxylic acid or sulfonic acid, there may be used, for example, methanol, ethanol, isopropyl alcohol, toluene, benzene, acetone, N-methylpyrolidon or the like.

As the method of coating the adhesive in the predetermined pattern, there may be selected either one of method in which the coater head is not mechanically controlled, such as gravure coating or gravure reverse coating, or method in which the coater head is mechanically controlled, such as slot die coating, slide die coating or comma reverse coating. The coating solution for the adhesive layer has a property of being more easily coated in comparison with the coating solution for the active material layer, and furthermore, the adhesive layer has a thickness far thinner than that of the active material layer, so that the coating for obtaining the desired pattern can be done by a coating method which does not require the mechanical control of the coater head. Accordingly, in the case where the binder is coated in the predetermined pattern, the coating process can be performed more precisely at a speed higher than that in the case of coating the active material layer in the predetermined pattern.

Figure 17:
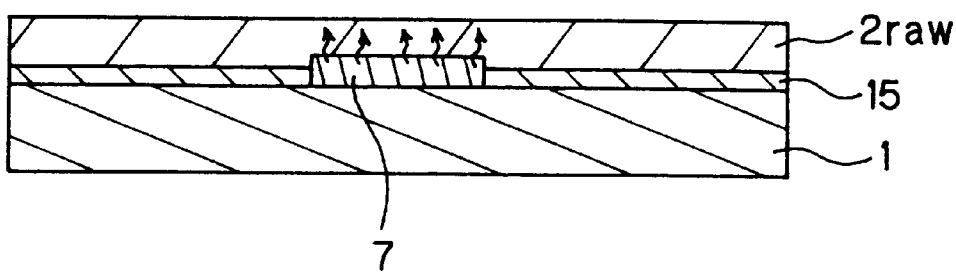
FIG. 17 is a view explaining one process for a method of a third embodiment for producing the electrode plate.

Next, as shown in FIG. 17, the coating solution for the active material layer at least containing the active material and the binder is coated to form the coating layer 2*raw* entirely on the surface of the collector on the side on which the high polymer resin layer 7 and the adhesive layer 15 are formed. During a time of drying the coated film, as like in the first embodiment, a portion of the high polymer layer 7 is gradually dissolved and impregnated upward in the coated layer 2*raw*.

Figure 18:
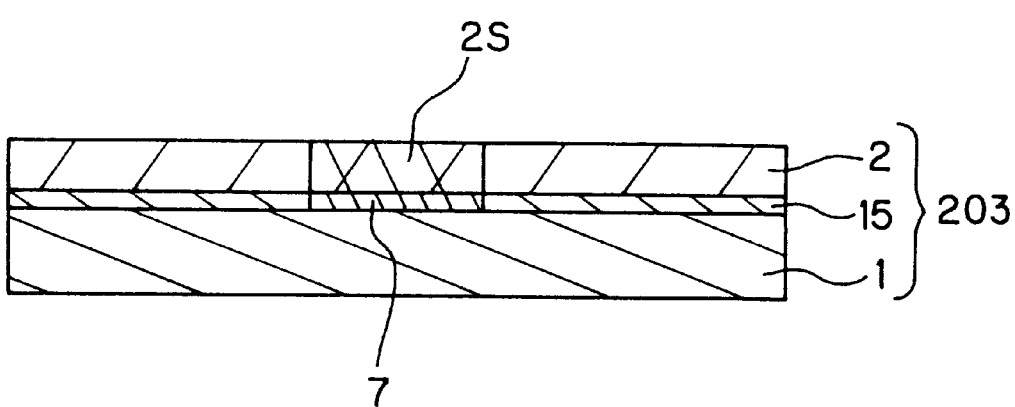
FIG. 18 is a view explaining one process for a method of a third embodiment for producing the electrode plate.

When the coated layer 2*raw* has been dried and the active material layer 2 has been formed, as shown in FIG. 18, an intermediate product 203 of the electrode plate can be obtained. In such intermediate product 203, the high polymer resin is impregnated and then solidified only in the active material layer 2*s* in the area in which the non-coated portion is to be formed. Further, usually, the high polymer resin layer 7 remains, without being completely absorbed, directly below the active material layer 2*s* in this area.

Figure 19:
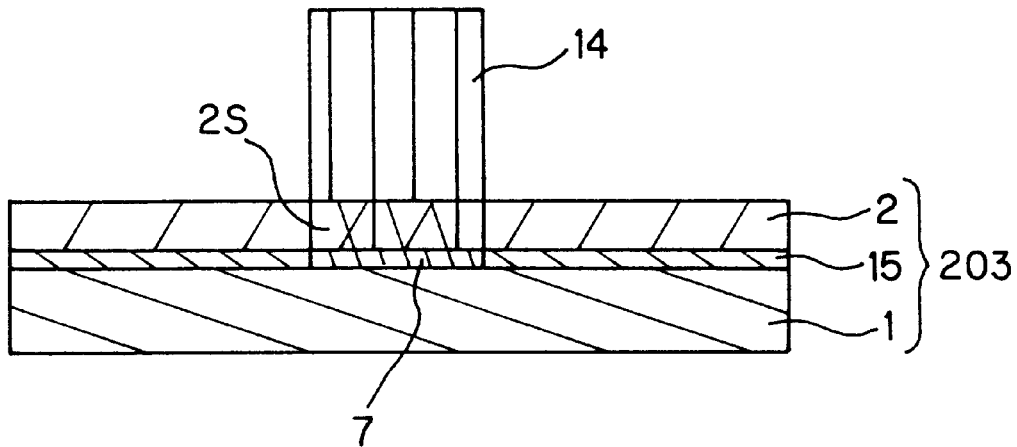
FIG. 19 is a view explaining one process for a method of a third embodiment for producing the electrode plate.

Next, as shown in FIG. 19, the thermoplastic resin sheet, not shown, or thermoplastic resin product 14 is selectively thermo-compressively bonded to the surface of the active material layer 2*s* in the area of the intermediate product 203 of the electrode plate in which the non-coated portion is to be formed, and the molten thermoplastic resin is impregnated into the active material layer 2*s* in this area. When the thermoplastic resin product is used, the thermoplastic resin product 14 is pressed against the surface of the active material layer of the intermediate product 203 of the electrode plate and then heated from the opposed surface of the intermediate product 203, thus performing the thermo-compression bonding.

Figure 20:
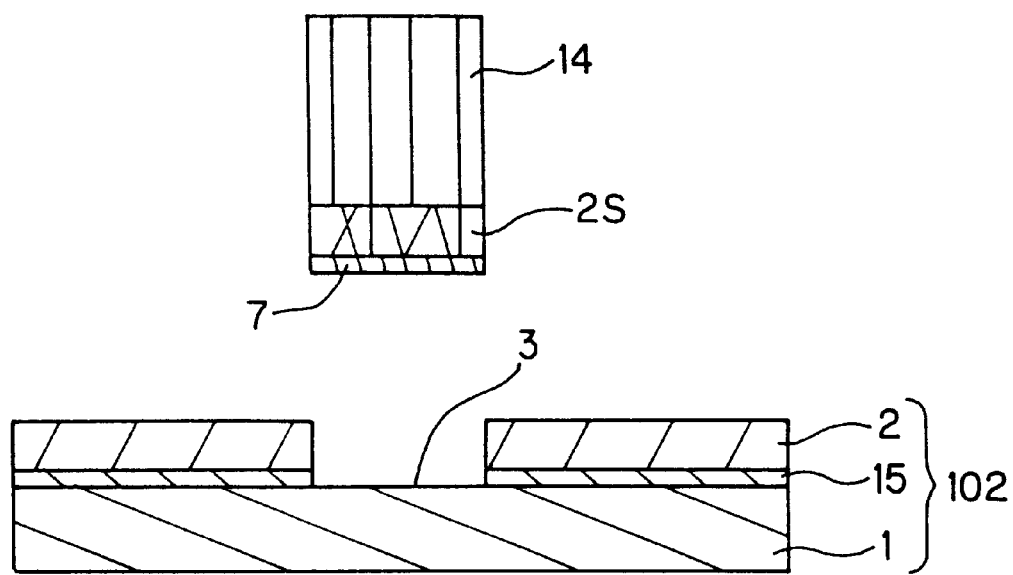
FIG. 20 is a view explaining one process for a method of a third embodiment for producing the electrode plate.

After the thermo-compression bonding, the active material layer 2 with the thermoplastic resin product 14 being adhered thereto is cooled. In this time, as like in the first embodiment, the high polymer resin transferred from the high polymer resin layer 7 and the thermoplastic resin transferred from the thermoplastic resin product 14 are impregnated and solidified in the active material layer 2s in the area in which the non-coated portion is to be formed, and the thus solidified portion has a cohesive force highly increased in comparison with that of the surrounding portion thereof. Further, the high polymer resin layer 7 having a weak adhesion exists between the active material layer 2s and the collector in the area mentioned above. Therefore, the active material layer 2s in the area in which the noncoted portion is to be formed has a peelability higher than that in the surrounding portion thereof Still furthermore, in this third embodiment, the active material layer 2 is formed to the collector 1 through the adhesive layer 15 in the area in which the active material layer is to be formed, and in this area, the adhesion thereof is made high. Therefore, according to the method of the third embodiment, the difference, in the peelability or adhesion property of the active material layer 2s, with respect to the collector, in the area in which the non-coated portion is to be formed, from that of the active material layer in the area in which the active material layer is to be formed is made larger than the difference in the fist embodiment. For this reason, as shown in FIG. 20, by peeling and removing the thermoplastic resin product from the intermediate product of the electrode plate, the active material layer 2s in the area in which the non-coated portion is to be formed adheres to the thermoplastic resin product and is removed together therewith, and the surrounding active material layer remains as it is on the surface of the collector. In the manner mentioned above, the non-coated portion at which the collector surface is exposed and the active material layer 2 having the pattern complementary to the pattern of the non-coated portion 3 are formed, thus obtaining the electrode plate 102.

According to this method of the third embodiment, since the difference, in the peelability or adhesion property of the active material layer in the area in which the non-coated portion is to be formed, from that of the active material layer in the area in which the active material layer remains is made further larger than the difference in the first embodiment, the selective peeling of the active material layer can be made further easily. Furthermore, as shown in FIG. 21A, even in a case where the high polymer resin layer 7 is formed in the area of the surface of the collector in which the non-coated portion is to be formed and, thereafter, the adhesive layer 15 is formed on the entire surface of the collector so as to completely cover the high polymer resin layer 7, the active material layer in the area in which the non-coated portion is to be formed can be selectively peeled off with no problem. Still furthermore, as shown in FIG. 21B, in a case where the adhesive layer 15 is formed on the entire surface of the collector 1 and, thereafter, the high polymer resin layer 7 is formed, through the adhesive layer 15, in the area of the surface of the collector in which the non-coated portion is to be formed, the peeling is caused at the boundary surface portion between the adhesive layer 15 and the high polymer resin layer 7 and, hence, the adhesive layer 15 remains in the area of the collector surface in which the non-coated portion is to be formed, but the pattern of the non-coated portions can be formed with no problem. With the present invention, there provides no problem even if such adhesive layer remains in the "non-coated portion at which the collector surface is exposed" as far as that portion satisfies the performance required for the non-coated portion. However, in a case where the non-coated portion is used as a portion to which a terminal is mounted, it is preferred that the coating amount of the adhesive is adjusted to be not more than 0.1 g/m$^2$ so as not to give an adverse affect to the conductive performance of the electrode plate.

In a case where a secondary battery is produced by using the electrode plate produced by the method mentioned above, in order to remove water content in the active material layer before the battery assembling process, it is desirable to preliminarily perform a heat treatment, a pressure reduction treatment or the like.

For example, in a case where a lithium series secondary battery is to be manufactured by using such electrode plate, there is used a nonaqueous electrolyte which is obtained by dissolving lithium salt as solute into an organic solvent. As the lithium salt, there may be used: inorganic lithium salt such as $LiClO_4$, $LiBF_4$, $LiPF_6$, $LiAsF_6$, $LiCl$, $LiBr$ or the like; or organic lithium salt such as $LiB(C_6H_5)_4$, $LiN(SO_2CF_3)_2$, $LiC(SO_2CF_3)_3$; $LiOSO_2C_6F_3$, $LiOSO_2C_2F_5$, $LiOSO_2C_3F_7$, $LiOSO_2C_4F_9$, $LiOSO_2C_5F_{11}$, $LiOSO_2C_6F_{13}$, $LiOSO_2C_7F_{15}$, or the like.

As an organic solvent for dissolving the lithium salt, there may be used cyclic esters, chain esters, cyclic ethers, chain ethers or the like. More specifically, the cyclic esters may be exemplified by propylene carbonate, butylene carbonate, γ-butyrolactone, vinylene carbonate, 2-methyl-γ-butyrolactone, acetyl-γ-butyrolactone and γ-valerolactone.

The chain esters may be exemplified by dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carboante, butyl propyl carbonate, propionic acid alkyl ester, malonic acid dialkyl ester, and acetic acid alkyl ester.

The cyclic ethers may be exemplified by tetrahydrofuran, alkyltetrahydrofuran, dialkyltetrahydrofuran, alkoxytetrahydrofuran, dialkoxytetrahydrofuran, 1,3-dioxolan, alkyl-1,3-dioxolan and 1,4-dioxolan.

The chain ethers may be exemplified by 1,2-dimethoxyethane, 1,2-diethoxyethane, diethyl ether, ethylene glycol dialkylether, diethylene glycol dialkylether, triethylene glycol dialkylether and tetraethylene glycol dialkylether.

As mentioned above, according to the present invention, there can be provided an electrode plate having high thickness precision of the active material layer at the peripheral portion thereof and/or high positional precision at the boundary line between the active material layer and the non-coated portion. Accordingly, it is possible to save an increasing amount of the active material for the negative electrode required for maintaining, in a safety area, the capacity balance between the positive electrode and the negative electrode.

Furthermore, since there is no built-up portion at the edge portion of the active material layer, any damage is not given to the electrode plate and the pressing machine at the press working time, and fine electrode plate wound-up state can be provided. Further, there is no fear of damaging the separator in the battery.

Still furthermore, high patterning precision can be realized, and since the boundary line of the edge portion is not waved, the position of the active material layer can be automatically exactly sensed, and the working efficiencies at the time of coating the back surface of the collector and assembling the battery can be improved.

EXAMPLE

Example 1

(1) Preparation of Positive Electrode Plate

A styrene-acrylonitrile copolymer as a high polymer resin was dissolved in a mixture solvent of toluene and methyl ethyl ketone (weight ratio of 1:1) and prepared a high polymer resin solution (solid component of 20 weight %).

The thus prepared high polymer resin layer was coated on an aluminum foil collector in form of continuous sheet shape having width of 330mm and thickness of 20 μm and then dried thereby to form a high polymer resin layer with rectangularly shaped patterns, each having dimension of 280 mm in the width direction of the aluminum foil and 30 mm in the longitudinal direction thereof with coated amount of 0.5 g/m² (dried time), which are repeatedly arranged in the longitudinal direction of the aluminum foil with a pitch of 800 mm.

Next, to varnish of polyvinylidene fluoride, another component was added, and then agitated and mixed for 30 minutes by means of a planetary mixer (K.K. Kodaira Seishaku Sho), thus preparing a coating solution for the active material layer of the positive electrode in form of slurry. The composition of the coating solution was as follows.

Coating Solution for Active Material Layer for Positive Electrode

Active material for positive electrode (Powder of $LiCoCO_2$ having a particle size of 1 to 100 μm): 89 weight parts Conductive material (Powder of graphite): 8 weight parts Binder (Varnish of polyvinyliden fluoride) (N-methyl-2-pyrolidone solution having solid component of 12%, KF#1120, manufactured by Kureha Kagaku K.K): 33 weight parts The thus prepared coating solution for the positive electrode was coated on the entire surface of the collector surface on which the high polymer resin layer was formed by means of a die coater, and thereafter, the coated collector was passed, to dry the same, in a drying oven which has a length of 8 m and in which a temperature increases subsequently by every 2 m (80° C.–100° C.–130° C.–140° C.) at a speed of 4 m/min, thereby forming the coated layer having a coated amount of 200 g/m² at the dryed time. Thereafter, the collector was placed in a vacuum oven of a temperature of 80° C. and aged for 48 hours thereby to remove the water content in the coated layer. After the aging, the coated layer of the collector was pressed by means of a roll press machine with a line pressure of 0.5 ton/cm, thus obtaining a positive electrode plate.

(2) Preparation of Negative Electrode Plate

A high polymer resin layer was formed in shape of patterns on a copper foil in form of continuous sheet having a width of 330 mm and a thickness of 14 μm by using the same high polymer resin solution as that used for the preparation of the positive electrode plate, by the same method as that for the positive electrode plate, and with the same coated amount as that for the positive electrode plate.

Next, to varnish of polyvinylidene fluoride, another component was added, and a coating solution for the active material layer of the negative electrode was prepared in the manner similar to that for the coating solution for the positive electrode plate. The composition of the coating solution was as follows.

Coating Solution for Active Material Layer for Negative Electrode

Active material for negative electrode (Powder of graphite powder): 85 weight parts Binder (Varnish of polyvinyliden fluoride) (N-methyl-2-pyrolidone solution having solid component of 12%, KF#1120, manufactured by Kureha Kagaku K.K): 125 weight parts Dispersant: N-methyl-2-pyrolidone: 115 weight parts The thus prepared coating solution for the negative electrode was coated on the surface of the collector surface on which the high polymer resin layer was formed by the same method as that for the positive electrode plate and then dried, and the coated layer was formed with the coated amount of 100 g/m² at the dried time. Thereafter, the aging was performed by the same methods as that for the preparation of the positive electrode plate and then the press working was carried out, thus obtaining a negative electrode plate.

(3) Peeling of Active Material Layer

Polyethylene heat seal members each having a thickness of 112 μm as a thermoplastic resin sheet (laminate sheet of polyethylene film having a thickness of 100 μm and polyethyleneterephthalate film having a thickness of 12 μm; polyethylene is MORETEC0238N manufactured by Idemitsu Sekiyu K.K.) were laminated on the active material layers of the thus obtained positive electrode plate and negative electrode plate, a hot plate having dimension of 280 mm×30 mm, that is, dimension corresponding to 12e in FIG. 13 is 280 mm and dimension corresponding to 12f in FIG. 13 is 30 mm, was pressed in conformity with the patterns of the high polymer resin layers and then carried out the thermo-compression bonding for 2 seconds with 20 kgf/cm² at a temperature of 150° C. Thereafter, the thermoplastic resin sheet was peeled off immediately without cooling the same. The peeling process was easily completed at one time peeling and a clean collector surface appeared without repeating the peeling process. The expansion and deformation of the pattern of the peeled portion (non-coated portion) and the production of powders at the edge portion of the active material layer was not observed. Further, it was found that the peeling could be finely performed with no problem with respect to the positive electrode plate and the negative electrode plate before the press working has been done.

With respect to the positive electrode plate and the negative electrode plate after the peeling process, portions near the boundary portions of the active material layers and the non-coated portions was measured by means of a surface roughness tester (SURFCOM of Tokyo Seimitsu K.K.). Furthermore, The thickness of the area of the active material layer having dimension of about 100 mm from the peripheral edge portion thereof towards the inside thereof was measured with an interval of 0.5 mm by means of a contact-type thickness meter (MICROFINE of Union Tool K.K.). The average thickness of the active material layer expect the peripheral edge portion thereof was 70 μm in the positive electrode plate and 90 μm in the negative electrode plate, and the maximum thickness in an area having dimension of 20 mm inside from the edge portion of the active material layer was the same as this average thickness. Accordingly, there is substantially no difference between the maximum thickness and the average thickness of the active material layer, and any built-up portion was not observed at the edge portion. The width of the portion inclined in thickness at a portion near the edge portion was about 100 μm. Further, the shifting (displacement) amount between the initially aimed pattern and the actually formed pattern was not more than 0.2 mm.

Example 2

(1) Preparation of Positive Electrode Plate 100 weight parts of a solution (solid component of 20 weight %) prepared by dissolving a styrene-acrylonitrile copolymer as a high polymer resin in a mixture solvent of toluene and methyl ethyl ketone (weight ratio of 1:1) and 50 weight parts of MOLDWISE F-57NC (Trade Name) (manufactured by Accel Plastic Research Laboratory Co., Ltd.) containing polytetrafluoroethylene particle at a ratio of 6 weight % as a powder component, were mixed and prepared a high polymer resin solution in which powders are dispersed.

The thus prepared high polymer resin solution was coated on one surface of an aluminum foil collector in form of continuous sheet shape having width of 330 mm and thickness of 20 µm by the same method performed in the Example 1 and then dried thereby to form a high polymer resin layer with the same coated amount and same pattern as those in the Example 1. Furthermore, the high polymer resin solution was coated on the other surface of the collector by the same method as mentioned above and then dried thereby to form a high polymer resin layer with the same coated amount and same pattern as those formed to the opposed one surface of the collector in the plane symmetry.

Next, the same coating solution for the active material for the positive electrode as that in the Example 1 was coated entirely on the one surface of the aluminum foil collector by the same method as that in the Example 1 and then dried and pressed thereby to form the active material layer for the positive electrode with the coated amount of 200 g/m$^2$ at the dried time.

Furthermore, the active material layer for the positive electrode was formed on the other surface of the collector by the same manner as that mentioned above thereby to obtain a positive electrode having the active material layers on both the surfaces of the collector.

(2) Preparation of Negative Electrode Plate

High polymer resin layers with the same amounts and same patterns as mentioned above were formed, in plate symmetry, on both the surfaces of a copper foil in a form of continuous sheet having width of 330 mm and thickness of 14 µm by coating the above-mentioned high polymer resin solution containing the powder components and then dried through the same method as mentioned above. Next, the same coating solution for the active material for the negative electrode as that in the Example 1 were coated entirely on both the surfaces of the copper foil collector by the same method as that in the Example 1 and then dried and pressed thereby to form the active material layer for the negative electrode with the coated amount of 100 g/m$^2$ at the dried time.

(3) Peeling of Active Material Layer

Polyethylene heat seal members each having a thickness of 112 µm as a thermoplastic resin sheet (laminate sheet of polyethylene film having a thickness of 100 µm and polyethylene terephthalate film having a thickness of 12 µm; polyethylene is MORETEC0238N manufactured by Idemitsu Sekiyu K.K.), which are the same as those used in the Example 1, were laminated on both the surfaces of the thus obtained positive electrode plate and negative electrode plate, and a hot plate having dimension of 280 mm×30 mm was pressed in a manner that the electrode plates were interposed in conformity with the patterns of the high polymer resin layers and then carried out the thermo-compression bonding for 2 seconds with 20 kgf/cm$^2$ at a temperature of 150° C. Thereafter, the thermo-plastic resin sheet was peeled off immediately without cooling the same. The peeling process was easily completed at one time peeling and a clean collector surface appeared without repeating the peeling process. The expansion and deformation of the pattern of the peeled portion (non-coated portion) and the production of powders at the edge portion of the active material layer was not observed. In this Example, the active material layers were formed with high precision as like in the Example 1 on both the surfaces of the positive electrode plate and negative electrode plate with the plate symmetry. Further, the absolute value of the shifting amount of patterns on the front and back surfaces was less than 0.5 mm.

What is claimed is:

1. A method of producing an electrode plate for a secondary battery with a nonaqueous electrolyte comprising steps of:

forming a high polymer resin layer by applying a coating solution for the high polymer resin layer containing a high polymer resin selected from the group consisting of styreneacrylonitrile, polymethylmethacryrate, polydiisopropylfumarate and derivatives thereof on an area of a surface of a collector in which a non-coated portion is to be formed;

forming an active material layer, by applying a coating solution for the active material layer which contains at least an active material and a binder and can dissolve the high polymer resin layer on the collector surface on which said high polymer resin layer is formed;

selectively performing thermo-compression bonding of a thermoplastic resin sheet or thermoplastic resin product to an area in which the non-coated portion is to be formed; and forming the non-coated portion at which the collector surface is exposed and the active material layer which has a pattern complementary to a pattern of the non-coated portion and has a peripheral edge portion with a maximum thickness in an area inside by 20 mm from a boundary portion between the non-coated portion and the active material layer being the same as an average thickness of the active material layer, by peeling off, after the thermo-compression bonding, the thermoplastic resin sheet or thermoplastic resin product from the collector thereby to peel off the active material layer, together with the high polymer resin layer, in the area in which the non-coated portion is to be formed.

2. A method of producing an electrode plate for a secondary battery with a nonaqueous electrolyte according to claim 1, wherein said high polymer resin layer further contains powder material.

3. A method of producing an electrode plate for a secondary battery with a nonaqueous electrolyte according to claim 1, wherein before the coating of the coating sloution for the active material layer, an adhesive is selectively coated in the area of the surface of the collector in which the active material layer is to be formed thereby to form an adhesive layer.

4. A method of producing an electrode plate for a secondary battery with a nonaqueous electrolyte according to claim 1, further comprising forming an inclined portion of a peripheral edge portion of the active material layer in which a thickness of the active material layer increases towards inside from a boundary portion between the non-coated portion and the active material layer, a width of an area, in which a thickness of the active material layer is less than 1 µm and less than an average thickness of the active material layer, is not more than 1 mm.

5. A method of producing an electrode plate for a secondary battery with a nonaqueous electrolyte according to claim 1, further comprising forming a pattern on said active material layer such that an absolute value of shifting of an initially aimed boundary line between the active material layer and the non-coated portion and an actually formed boundary line therebetween is not more than 1 mm.

6. A method of producing an electrode plate for a secondary battery with a nonaqueous electrolyte according to claim 1, further comprising forming on both the surfaces of the collector areas in which the nor-coated portions are to be formed, in plane symmetry with the collector being interposed therebetween;

forming high polymer resin layers to said areas respectively;

forming the active material layers to both the surfaces of the collector on which said high polymer resin layers are formed;

thermo-compressively bonding thermoplastic resin sheets or thermoplastic resin products simultaneously to the areas of both the surfaces of the collector in which the non-coated portions are to be formed;

and after the thermo-compression bonding, peeling off the thermoplastic resin sheets or thermoplastic resin products from the collector thereby forming patterns of the active material layers, in a plane symmetry, on both the surfaces of the collector with the collector being interposed therebetween so that an absolute value of a positional shifting between a boundary line between an actually formed active material layer formed on a front surface of the collector and an actually formed non-coated portion on the front surface of the collector and a boundary line between an actually formed active material layer formed on a back surface of the collector and an actually formed non-coated portion on the back surface of the collector is not more than 1 mm.

* * * * *